(12) United States Patent
Oberpriller

(10) Patent No.: US 12,111,397 B2
(45) Date of Patent: Oct. 8, 2024

(54) PIXEL DOMAIN FIELD CALIBRATION OF TRIANGULATION SENSORS

(71) Applicant: Banner Engineering Corp., Minneapolis, MN (US)

(72) Inventor: Wade Oberpriller, Minneapolis, MN (US)

(73) Assignee: Banner Engineering Corp., Minneapolis, MN (US)

(*) Notice: Subject to any disclaimer, the term of this patent is extended or adjusted under 35 U.S.C. 154(b) by 720 days.

(21) Appl. No.: 17/303,061

(22) Filed: May 19, 2021

(65) Prior Publication Data
US 2022/0291384 A1 Sep. 15, 2022

Related U.S. Application Data

(60) Provisional application No. 63/158,697, filed on Mar. 9, 2021.

(51) Int. Cl.
*G01S 17/58* (2006.01)
*B65G 13/00* (2006.01)
(Continued)

(52) U.S. Cl.
CPC ............ *G01S 17/58* (2013.01); *G01S 7/4814* (2013.01); *G01S 7/4816* (2013.01);
(Continued)

(58) Field of Classification Search
CPC ...... G01S 17/58; G01S 7/4814; G01S 7/4816; G01S 7/4972; G01S 17/06; G01S 17/42;
(Continued)

(56) References Cited

U.S. PATENT DOCUMENTS

| | | |
|---|---|---|
| 4,258,250 A | 3/1981 | Schmidt |
| 5,914,785 A | 6/1999 | Allison et al. |

(Continued)

FOREIGN PATENT DOCUMENTS

| | | |
|---|---|---|
| CN | 107861113 B | 1/2020 |
| DE | 102016122335 A1 | 5/2018 |

(Continued)

OTHER PUBLICATIONS

International Search Report and Written Opinion of the International Searching Authority in related International Application No. PCT/US2022/071037, dated May 20, 2022, 11 pages.
(Continued)

*Primary Examiner* — Jennifer D Bennett
(74) *Attorney, Agent, or Firm* — Thompson Patent Law Offices PC

(57) ABSTRACT

Apparatus and associated methods relate to a field-adjustable distance sensor configured to translate a transfer function of the sensor by a substantially constant value in a position domain by calibration at one or more known distances. In an illustrative example, the transfer function may correlate multiple distances to corresponding position vectors describing a position of a light signal on a receiver. The receiver may, for example, generate a detection signal corresponding to a position on the receiver of a light signal reflected off a target. A control circuit may, for example, generate a position vector in response to the detection signal. A calibration constant (C) may be generated, for example, as a function of a known distance of the target and position vector. C may be applied, for example, to translate the transfer function in the position domain. Various embodiments may advantageously reduce non-linear error in a distance sensor.

22 Claims, 23 Drawing Sheets

(51) Int. Cl.
| | |
|---|---|
| *G01S 7/481* | (2006.01) |
| *G01S 7/497* | (2006.01) |
| *G01S 17/06* | (2006.01) |
| *G01S 17/42* | (2006.01) |
| *G01S 17/48* | (2006.01) |
| *G01S 17/89* | (2020.01) |

(52) U.S. Cl.
CPC ............ *G01S 7/4972* (2013.01); *G01S 17/06* (2013.01); *G01S 17/42* (2013.01); *G01S 17/48* (2013.01); *G01S 17/89* (2013.01); *B65G 13/00* (2013.01); *B65G 2203/0233* (2013.01); *B65G 2203/044* (2013.01)

(58) Field of Classification Search
CPC ........ G01S 17/48; G01S 17/89; G01S 7/4802; G01S 17/50; G01S 17/88; B65G 13/00; B65G 2203/044; B65G 43/08; B65G 2203/0241; B65G 2203/043; G06T 7/0004
See application file for complete search history.

(56) References Cited

U.S. PATENT DOCUMENTS

| | | | |
|---|---|---|---|
| 5,970,433 | A | 10/1999 | Oka et al. |
| 6,927,385 | B2 | 8/2005 | Adamietz et al. |
| 7,414,707 | B2 | 8/2008 | LaBelle et al. |
| 7,638,753 | B2 | 12/2009 | Merettig |
| 7,855,778 | B2 | 12/2010 | Yung et al. |
| 8,820,741 | B2 | 9/2014 | Hongo et al. |
| 8,857,815 | B2 | 10/2014 | Hongo et al. |
| 9,477,220 | B2 | 10/2016 | Shteinfeld et al. |
| 9,752,863 | B2 | 9/2017 | Hinderling et al. |
| 10,630,869 | B1 | 4/2020 | Forsythe |
| 10,663,567 | B2 | 5/2020 | Fenton et al. |
| 10,977,800 | B1 | 4/2021 | Hay et al. |
| 2006/0144899 | A1 | 7/2006 | Hu et al. |
| 2006/0187441 | A1 | 8/2006 | Sugiyama et al. |
| 2012/0019832 | A1 | 1/2012 | Momtahan |
| 2012/0235929 | A1 | 9/2012 | Hongo et al. |
| 2012/0312956 | A1 | 12/2012 | Chang et al. |
| 2012/0327287 | A1 | 12/2012 | Meyers et al. |
| 2014/0374569 | A1 | 12/2014 | Fuhr |
| 2015/0329296 | A1 | 11/2015 | Shteinfeld et al. |
| 2016/0091861 | A1 | 3/2016 | Liu et al. |
| 2016/0178512 | A1* | 6/2016 | Hall ................. G01N 21/4785 348/135 |
| 2016/0298809 | A1 | 10/2016 | Lutz et al. |
| 2018/0120424 | A1 | 5/2018 | Eshel et al. |
| 2018/0246189 | A1 | 8/2018 | Smits |
| 2019/0285751 | A1 | 9/2019 | Hall et al. |
| 2020/0018836 | A1 | 1/2020 | Nakamura et al. |
| 2020/0278447 | A1 | 9/2020 | Meinherz et al. |
| 2022/0250649 | A1* | 8/2022 | Staats ................ B60W 60/0027 |
| 2022/0291384 | A1 | 9/2022 | Oberpriller |

FOREIGN PATENT DOCUMENTS

| | | |
|---|---|---|
| EP | B188461 A1 | 7/2017 |
| WO | 2022192876 A1 | 9/2022 |

OTHER PUBLICATIONS

International Search Report and Written Opinion of the International Searching Authority in related International Application No. PCT/US2022/071036, dated Jun. 8, 2022, 11 pages.

Earl, B., Calibrating Sensors, Mar. 21, 2020, retrieved from the internet <https://learn.adafruit.com/calibratingsensors/single-point-calibration>.

Lee, et al, Stereo Image Capture and Distance Estimation with an SLR Digital Camera. In Modelling and Simulation / 804: Signal and Image Processing; ACTAPRESS: Banff, Canada, 2013, retrieved from the internet <https://doi.org/10.2316/P.2013.804-029 http://www.actapress.com/PaperInfo.aspx>.

Lindner, et al, A. Calibration of the Intensity-Related Distance Error of the PMD TOFCamera, In Proceedings of SPIE; 2007; vol. 6764., retrieved from the internet, <https://doi.org/10.1117/12.752808> <https://www.researchgate.net/profile/Andreas-Kolb-3/publication/241478403_Calibration_of_the_intensityrelated_distance_error_of_the_PMD_TOFcamera/links/0046352dff2a703a66000000/Calibration-of-the-intensity-related-distance-error-ofthe-PMD-TOF-camera.pdf>.

Lindner, et al, New Insights into the Calibration of ToF-Sensors; 2008, p. 5. retrieved from the internet <https://doi.org/10.1109/CVPRW.2008.4563172> <https://www.researchgate.net/publication/224320543_New_insights_into_the_calibration_of_ToF-sensors>.

Chapter II Demand and Replacement Claims filed in related International Application No. PCT/US2022/071037, dated Dec. 23, 2022, 26 pages.

Examiner's Report in related Canada Application No. 3,207,228 dated Sep. 14, 2023, 4 pages.

Informal Communication in related International Applicaion No. PCT/US2022/071037, dated Jan. 1, 2023, 5 pages.

International Preliminary Report on Patentability in related International Application No. PCT/US2022/071037, dated Jun. 16, 2023, 8 pages.

U.S. Appl. No. 62/916,087, filed Oct. 16, 2019, Wade Oberpriller.

Avago Technologies, "Optical Mouse Sensors." Avago Technologies, 2007, [Online] <https://media.digikey.com/pdf/Data%20Sheets/Avago%20PDFs/ToolKitSelectionGuide.pdf.>.

Banner Engineering Corp., "LH Series: High Precision Laser Measurement Sensor," n.d., retrieved from the internet Aug. 31, 2020, <https://www.bannerengineering.com/us/en/products/sensors/laser-distance-measurement/highprecision-laser-measurement-sensors-lh-series.html?sort=4#all>.

Banner Engineering Corp., "Q4X Laser Distance Sensor: The Ultimate Problem Solver," n.d., etrieved from the Internet Aug. 31, 2020, <https://www.bannerengineering.com/in/en/products/new-products/laser-distance-sensorq4x.html>.

Keyence, "Best Detection Ability in its Class" LR-Z series Self-contained CMOS Laser Sensor, Sep. 2013, <https://www.keyence.com/products/sensor/photoelectric/lr-z/features/feature-02.jsp>.

Lezhin, et al "Comparison of Different Methods of Non-contact Vibration Measurement," Procedia Engineering, vol. 176, pp. 175-183, 2017, <doi: 10.1016/j.proeng.2017.02.286>.

S. Alavi, "Comparison of Some Motion Detection Methods in cases of Single and Multiple Moving Objects," International Journal of Image Processing, vol. 6, No. 5, pp. 389-396, 2012, [Online]. Available: <https://www.researchgate.net/publication/306357420_Comparison_of_Some_Motion_Detection_Methods_in_cases_of_Single_and_Multiple_Moving_Objects>.

Tripathy, et al., "Adaptive Threshold Background Subtraction for Detecting Moving Object on Conveyor Belt," International Journal of Students' Research in Technology & Management, vol. 5, No. 4, pp. 46-51, Nov. 2017, <doi: 10.18510/ijsrtm.2017.546>.

International Preliminary Report on Patentability in related International Application No. PCT/US2022/071036, dated Sep. 21, 2023, 10 pages.

* cited by examiner

PIXEL DOMAIN FIELD CALIBRATION OF TRIANGULATION SENSORS

CROSS-REFERENCE TO RELATED APPLICATIONS

This application claims the benefit of U.S. Provisional Application Ser. No. 63/158,697, titled "NON-CONTACT MOTION DETECTION SENSOR UTILIZING DISTANCE AND INTENSITY STATISTICS," filed by Wade Oberpriller, et al., on Mar. 9, 2021.

This application contains related common subject matter by a common inventor with U.S. application Ser. No. 17/072,028, titled "IMAGE-BASED JAM DETECTION," filed by Wade Oberpriller, et al., on Oct. 15, 2020; U.S. Application Ser. No. 62/916,087, titled "Imaging System Using Triangulation," filed by Wade Oberpriller, et al., on Oct. 16, 2019; and, U.S. application Ser. No. 62/924,020, titled "Imaging System Using Triangulation," filed by Wade Oberpriller, et al., on Oct. 21, 2019.

This application incorporates the entire contents of the foregoing application(s) herein by reference.

TECHNICAL FIELD

Various embodiments relate generally to field calibration of distance sensors.

BACKGROUND

Distance sensors may be used in various industrial, commercial, and/or residential settings. By way of example and not limitation, distance sensors may be used to monitor operator presence, motion, jam presence, quality control, or some combination thereof. Distance sensors may, for example, be configured to detect the presence of an object in a detection window, at any point in front of the sensor, or some combination thereof.

Distance sensors may, for example, be configured to determine distance as a function of a spatial position of a reflected electromagnetic signal onto one or more sensing elements. Spatial position-based distance sensors may include, by way of example and not limitation, infrared sensors, laser (triangulation) sensors, or some combination thereof. A sensor may include, for example, at least one emitter configured to launch an electromagnetic signal, at least one sensing element configured to receive a reflection of the electromagnetic signal, and a control circuit configured to determine a distance as a function of the position of the reflected electromagnetic signal on the at least one sensing element.

SUMMARY

Apparatus and associated methods relate to a field-adjustable distance sensor configured to translate a transfer function of the sensor by a substantially constant value in a position domain by calibration at one or more known distances. In an illustrative example, the transfer function may correlate multiple distances to corresponding position vectors describing a position of a light signal on a receiver. The receiver may, for example, generate a detection signal corresponding to a position on the receiver of a light signal reflected off a target. A control circuit may, for example, generate a position vector in response to the detection signal. A calibration constant (C) may be generated, for example, as a function of a known distance of the target and position vector. C may be applied, for example, to translate the transfer function in the position domain. Various embodiments may advantageously reduce non-linear error in a distance sensor.

Various embodiments may achieve one or more advantages. For example, some embodiments may advantageously recalibrate a sensor to reduce error introduced by a shift in a position (e.g., pixel position) vs distance transfer function of the sensor. In various embodiments a calibration constant may be advantageously generated based on a single measurement and calibration. Various embodiments may advantageously reduce random error in measurement at a specific distance and/or in a specific sampling cycle by multiple calibration cycles and/or distances. Various embodiments may advantageously calibrate and/or maintain calibration according to a (predetermined) calibration threshold (e.g., measurement cycles, time). In various embodiments a (calibrated) distance may be advantageously determined from a position of a reflected signal on a receiver.

Various embodiments providing a calibrated lookup table (LUT) (e.g., distance:position, correction:distance, correction:position vector) may advantageously reduce or eliminate an error between measured distance and an actual distance while minimizing and/or eliminating runtime performance costs. In various embodiments a distance may, for example, be advantageously calibrated by application of a calibrated sensor characteristic profile. In various embodiments a distance may, for example, be advantageously calibrated by retrieval of a distance correction generated as a function of a calibrated sensor characteristic profile.

Various embodiments may advantageously improve accuracy relative to a linear null/span teach method by leveraging a non-linear relationship in the distance domain between distance to a target and position of a reflected light beam off the target onto a receiver. Various embodiments may advantageously provide a more accurate and/or simpler (field) calibration method (e.g., using one or more calibration points).

In various embodiments calibration by position-domain-shift of a transfer function of a sensor may advantageously reduce error within a predetermined accuracy threshold. For example, various embodiments may advantageously provide rapid field-calibration to improve and/or restore accuracy by presenting one or more targets at one or more known distances. In various embodiments the function may be advantageously calibrated to the magnitude of each sensor's accuracy error at one or more taught distances.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a field-calibratable distance sensor (FCDS) system 100 is introduced with reference to FIGS. 1-2. Second, that introduction leads into a description with reference to FIGS. 2-14 of some exemplary embodiments of FCDSs. Third, with reference to FIGS. 15-21, FCDSs apparatus and methods disclosed herein are described in application to exemplary use cases. Finally, the document discusses further embodiments, exemplary applications and aspects relating to FCDSs.

Figure 1:
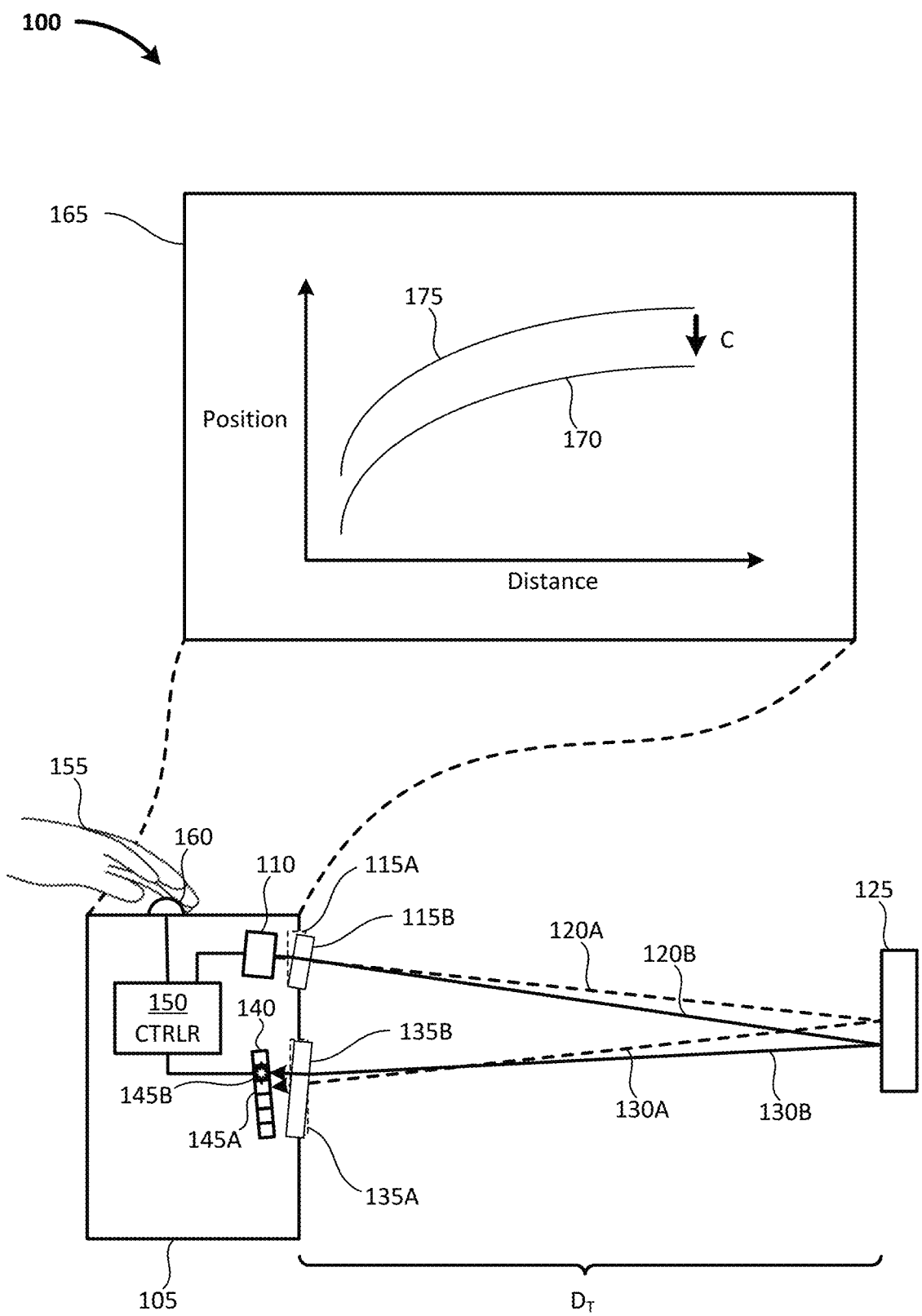
FIG. 1 depicts an exemplary field-calibratable distance sensor (FCDS) in an exemplary use case scenario.

FIG. 1 depicts an exemplary field-calibratable distance sensor (FCDS) in an exemplary use case scenario. In the depicted system 100, an FCDS 105 is provided with an emitter 110 and an emitter lens in first configuration 115A (e.g., as configured by a factory). The emitter 110 launches an electromagnetic signal (EMS) 120A (e.g., an optical beam) through the emitter lens in configuration 115A. The EMS 120A reflects off of a target 125 at a distance DT from the FCDS 105. At least some portion of the EMS 120 is reflected off the target, generating reflected EMS (REMS) 130A. The REMS 130A passes through a receiver lens in a first configuration 135A (e.g., as configured from the factory) and impinges on receiver 140.

As depicted, the receiver 140 includes a plurality of spatially distributed sensing elements. For example, the receiver 140 may be configured as a multi-pixel (e.g., 1D, 2D, 3D) array of pixels. Each pixel may, for example, include an individual sensing element. Each element may, for example, be a photosensitive element. A photosensitive element may, by way of example and not limitation, be a photodiode and/or other photoelectronic element.

A controller 150 (e.g., control circuit, processor, ASIC, FPGA) may determine a measured distance as a function of the position of impingement of the REMS 130A on the receiver 140. In the depicted example, the REMS 130A passes through the first configuration 135A to impinge on a first pixel 145A of the receiver 140. The controller 150 may, for example, determine a first measured distance (DM1) based on the position of the first pixel 145A on the receiver 140. The receiver 140 may, for example, generate a signal corresponding to activation of the first pixel 145A. The controller 150 may, by way of example and not limitation, determine a first position vector from the signal. The controller 150 may retrieve (e.g., from a lookup table) a distance corresponding to the first position vector.

The first configuration 115A of the emitter lens, EMS 120A, REMS 130A, and the first configuration 135A of the receiver lens may, by way of example and not limitation, correspond to a configuration of the FCDS 105 when departing a factory (e.g., a 'new' configuration). In the depicted example, the emitter lens has shifted from the first configuration 115A to a second configuration 115B. Likewise, the receiver lens has shifted from the first configuration 135A to a second configuration 135B. The change in configuration may, for example, correspond to aging of components, stress, impact, vibration, other (mechanical) inputs, or some combination thereof. In various embodiments a housing, lens(es), emitter, receiver, other components in the optical path of an emitted and/or reflected EMS, or some combination thereof, may shift relative to each other.

As depicted, the change in configuration of the lenses, relative to the housing of the sensor 105, the emitter 110, and the receiver 140, cause a corresponding change in the optical path. The emitter 110 launches an EMS 120B, which is displaced downwards from the previous (e.g., original) path. The EMS 120B strikes the target 125 and at least some portion of the EMS 120B reflects as REMS 130B. REMS 130B travels along a different path then REMS 130A due at least to the change in configuration of the emitter lens.

Furthermore, as the REMS 130B passes through the receiver lens in second configuration 135B, the altered configurations causes a further change from the original path relative to the receiver 140. Accordingly, the REMS 130B strikes the receiver 140 on a second pixel 145B. The sensor 105 may, for example, thereby determine a different (e.g., inaccurate) measured distance (DM2) although the distance DT of the target 125 relative to the sensor 105 has not changed.

In the depicted example, a user 155 operates an input element 160. The input element 160 is operatively coupled to the controller. The input element 160 may be configured to cause a calibration signal to be generated. The controller 150 may respond to the calibration signal by entering a teach mode. In the teach mode, the controller 150 may compare at least one position vector generated by the second REMS 130B to at least one expected position vector and/or distance corresponding to the target(s) 125 used for calibration. In various embodiments the comparison may, by way of example and not limitation, be performed directly (e.g., directly comparing position vectors), indirectly (e.g., after looking up a corresponding value, applying a function), or some combination thereof In the depicted example, a plot 165 depicts a spatial (e.g., pixel) domain transfer function (a first transfer function 170) defining a correlation between (1) a (physical) distance to a target on the horizontal axis and (2) a position (e.g., as defined by a position vector) of a REMS (e.g., 130A, 130B) on the receiver 140 on the vertical axis. A first transfer function 170 may, for example, correspond to an original calibration of the sensor 105 (e.g., as calibrated by a factory). A second transfer function 175 may, for example, correspond to an actual transfer function of the sensor 105 after aging and/or stressors. For example, the second transfer function 175 may define a relationship between a position of a REMS on the receiver 140 (e.g., a sensor) and a corresponding measured distance to a target when the lenses are in configuration 115B and 135B. As depicted, in the spatial domain the shift of the transfer function is substantially constant. In the depicted example, an (original) transfer function (the first transfer function 170) has shifted upward in the position (e.g., pixel) domain by a constant offset in position (e.g., pixel position).

During calibration operations (e.g., in the teach mode), the controller 150 may generate at least one correction constant C as a function of the true distance (DT) of the calibration target 125 and an actual (measured) position vector VM generated as a result of the second pixel 145B being activated by the REMS 130B. As depicted, the correction constant C may be configured to shift a current transfer function (second transfer function 175) in the position (e.g., pixel) domain back towards a desired (e.g., original, accurate) transfer function (e.g., the first transfer function 170). Accordingly, the controller 150 may advantageously recalibrate the sensor 105 to reduce error introduced by a shift in the transfer function.

In various embodiments the calibration may be performed in the field, as depicted. In various embodiments the calibration may, by way of example and not limitation, be performed as a single point calibration. For example, a target may be presented at a known distance (e.g., DT) and the sensor 105 be operated to enter a teach mode. The sensor may recalibrate based on a comparison between the known distance and a measured position vector (e.g., generated from the second pixel 145B being impinged on by the REMS 130B). A calibration constant may be advantageously generated based on the single measurement and calibration.

In various embodiments, one or more targets may be presented at one or more known distances. For example, one, two, three, or more targets may be presented at one or more known distances. Each target may, for example, be presented at one, two, three, or more known distances. The resulting position vector(s) and/or corresponding (uncalibrated) measured distances may, by way of example and not limitation, be averaged and/or otherwise used to generate a calibration constant C. Accordingly, random error in measurement at a specific distance or in a specific sampling cycle may be advantageously reduced and/or eliminated.

Figure 2:
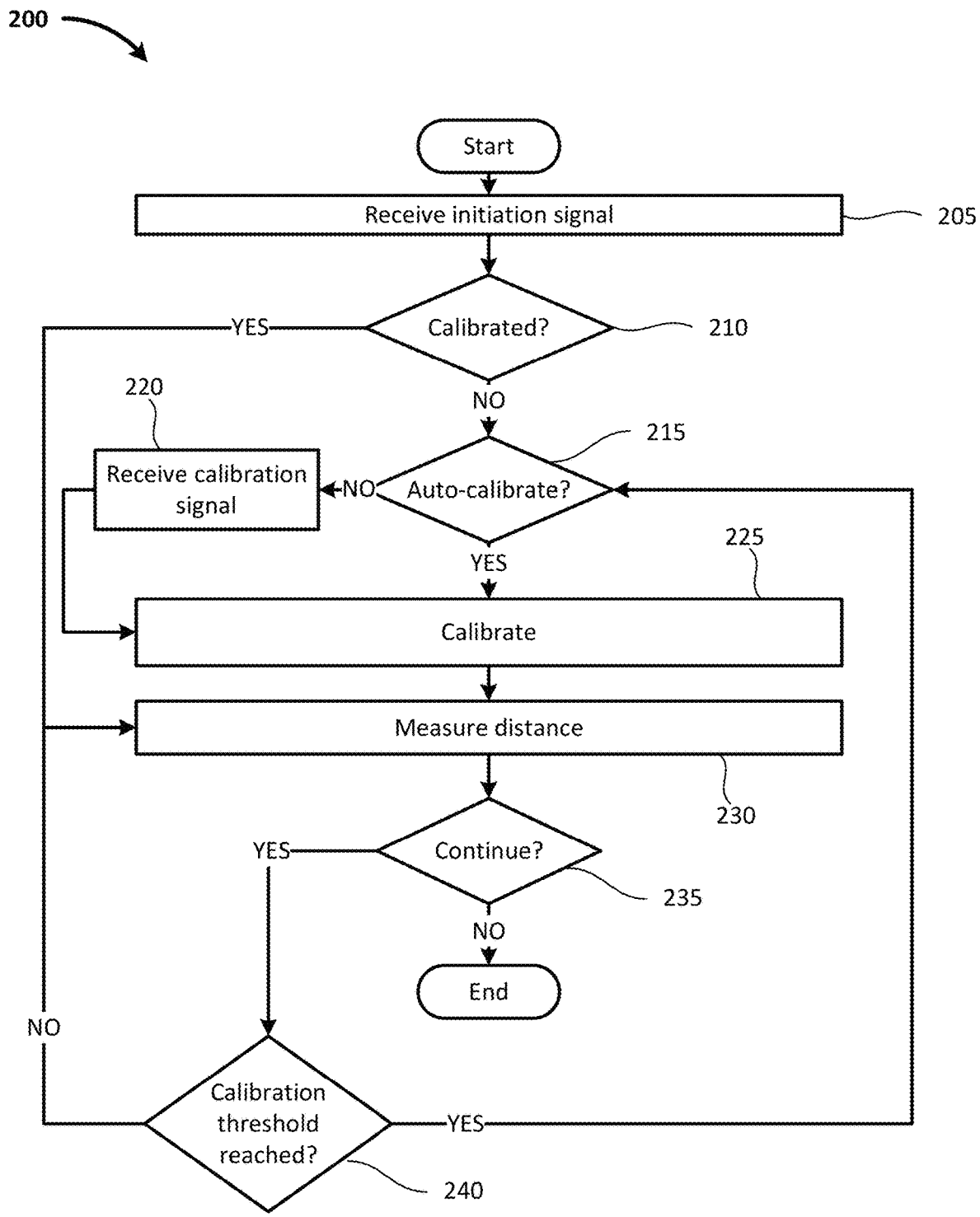
FIG. 2 depicts an exemplary method of operating an FCDS.

FIG. 2 depicts an exemplary method of operating an FCDS. In the depicted method 200, a sensor (e.g., 105) receives an initiation signal 205. The initiation signal may, by way of example and not limitation, be an automatically generated signal, a programmatically generated signal, a manually generated signal, or some combination thereof. The initiation signal may, by way of example and not limitation, correspond to power on, beginning of predetermined operations (e.g., conveyor belt activated, machine guarding activated), other appropriate trigger, or some combination thereof.

If the sensor has been calibrated 210 then the method proceeds to measure distance 230. If the sensor has not been calibrated 210, then the method proceeds to determine if the sensor may be auto calibrated 215. If the sensor cannot be auto calibrated 215, then the process waits for a calibration signal to be received (e.g., programmatically, via manual input from a user) 220. Insert can be auto calibrated 215, or a calibration signal has been received 220, then calibration 225 is performed. In various embodiments, by way of example and not limitation, calibration may be performed as described at least with reference to FIGS. 4, 7, 10, and 13.

Once the sensor has been calibrated 225, or if the sensor has already been calibrated 210, then the method proceeds to measure distance 230. In various embodiments distance may be measured once, periodically, repeatedly, continuously, or some combination thereof. In various embodiments distance may, for example, be measured as described at least with reference to FIGS. 5, 8, 11, and 14.

After distance has been measured 230 by the sensor, if the process is not to continue 235 (e.g., distance measurement is complete), then the method ends. If the process is to continue 235, then it is determined if a calibration threshold has been reached 240. In various embodiments a calibration threshold may, by way of example and not limitation, be a cycle count (e.g., recalibrate after X cycles), be a timer (e.g., recalibrate after Y units of time), or some combination thereof If the calibration threshold has not been reached 240, then the method returns to step 230 to measure distance. If the calibration threshold has been reached 240, then the method returns to step 215 to recalibrate and continue measurement. Accordingly, various embodiments may advantageously calibrate and/or maintain calibration according to a (predetermined) calibration threshold.

Figure 3:
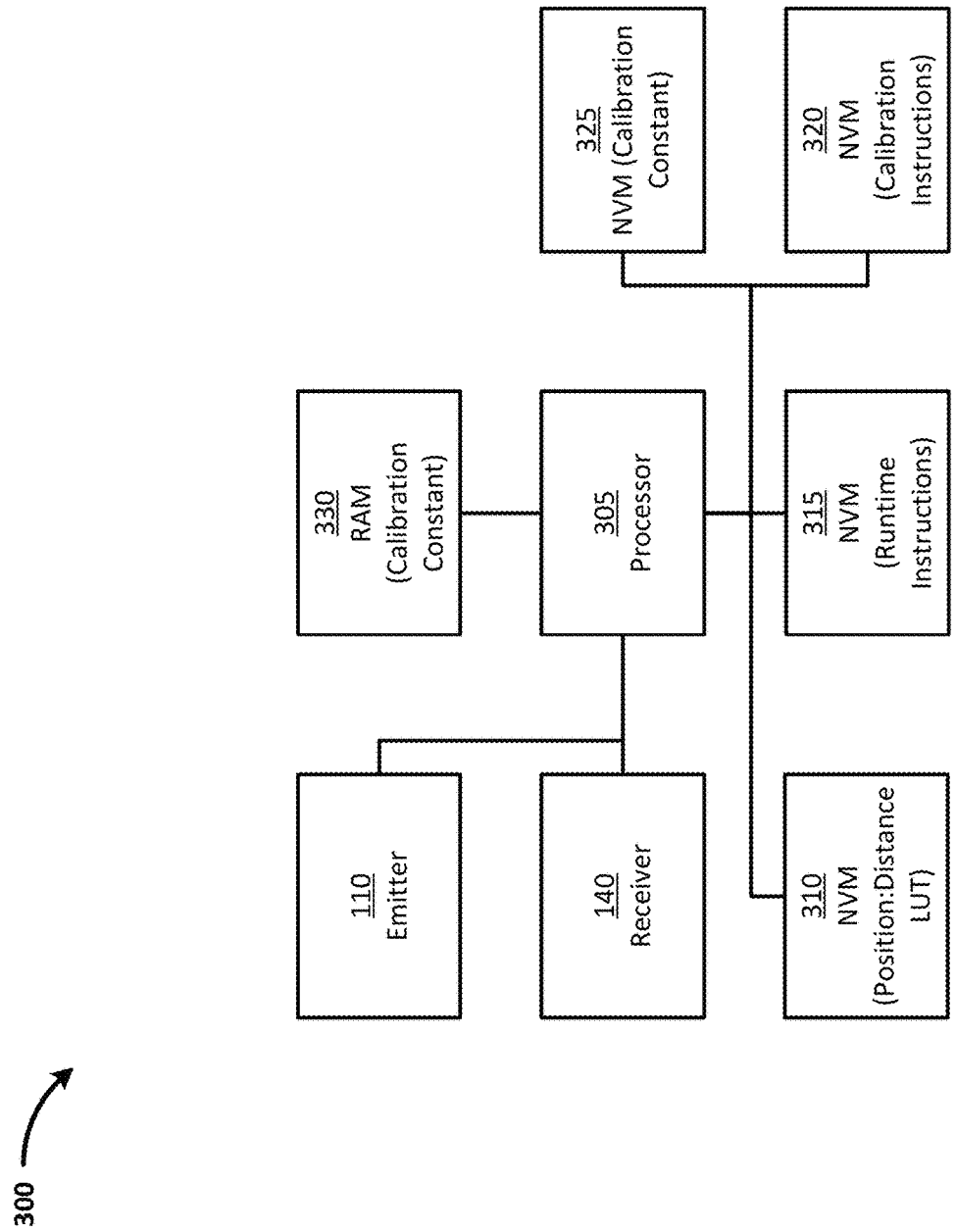
FIG. 3 depicts an exemplary block diagram of an FCDS configured to generate a sensor position vector calibration constant.

FIG. 3 depicts an exemplary block diagram of an FCDS configured to generate a sensor position vector calibration constant. The depicted FCDS system 300 includes a processor 305. The processor 305 is operably coupled to (e.g., in electrical communication with) the emitter 110 and the receiver (e.g., a spatially distributed receiver array) 140. The processor 305 is operably coupled at least to (e.g., in electrical communication with) non-volatile memory (NVM) modules 310, 315, 320, and 325. In various embodiments NVM modules may be combined and/or additional NVM modules may be provided.

In the depicted example, NVM module 310 is a position: distance lookup table (LUT). The lookup table may, for example, map each of multiple position vectors identifying a location of a REMS on the receiver 140 to a corresponding measured distance value. The NVM module 315 includes a program of operations configured to be executed as runtime instructions on the processor 305. The runtime instructions may, for example, be configured to cause the processor 305 to perform runtime operations described at least with reference to FIG. 5. The NVM module 320 includes a program of operations configured to be executed as calibration (e.g., teach mode) instructions on the processor 305. The calibration instructions may, for example, be configured to cause the processor 305 to perform calibration operations d1escribed at least with reference to FIG. 4. The NVM module 325 includes a calibration constant (e.g., C), which may be determined during calibration operations.

In the depicted example the processor 305 is operably coupled to a random access memory (RAM) module 330. In various embodiments RAM modules may be combined and/or additional RAM modules may be provided. As depicted the RAM module 330 includes the calibration constant at least part of the time such as, for example, when generated during calibration operations and/or during runtime operations applying the calibration constant.

Figure 4:
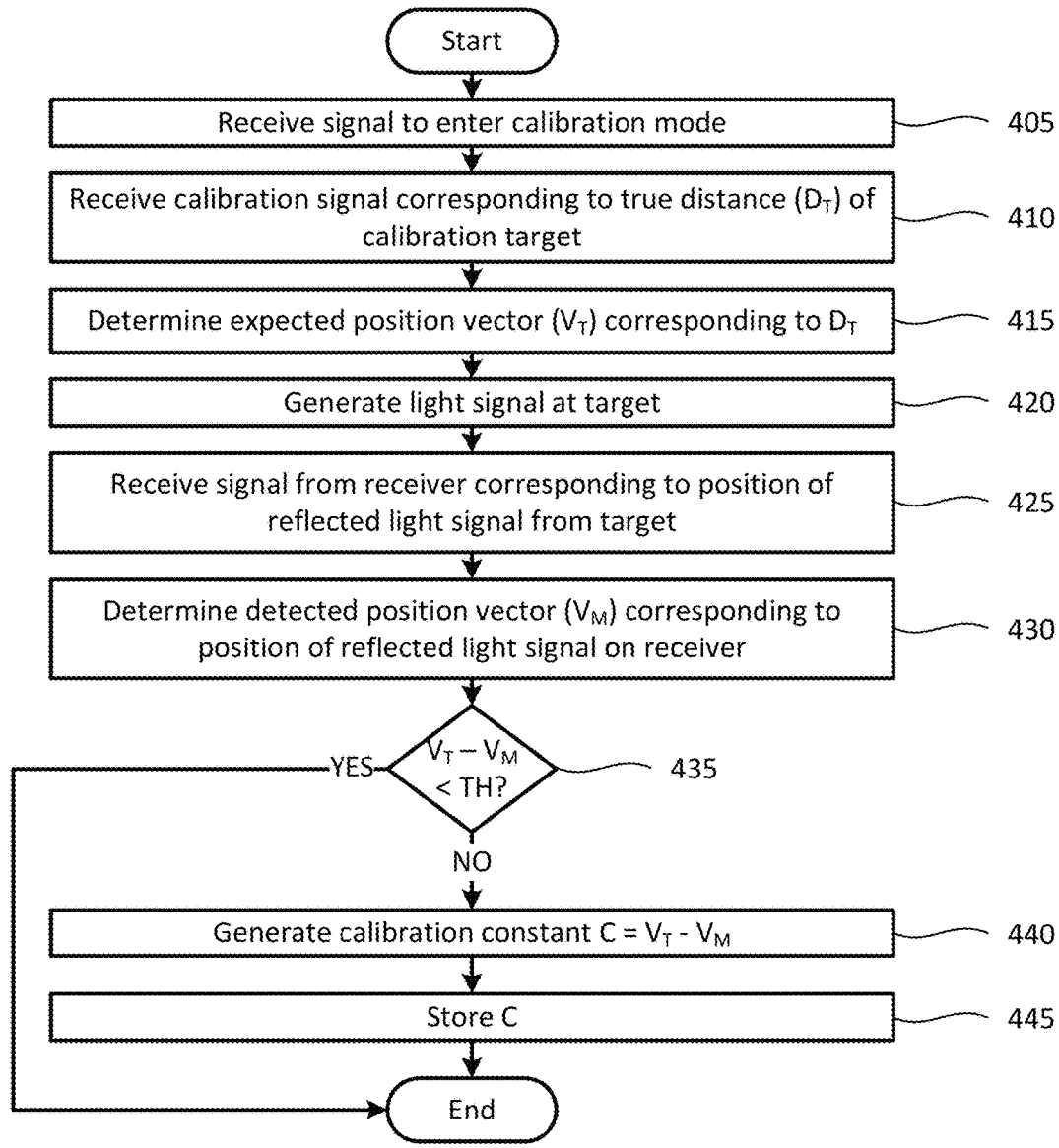
FIG. 4 depicts an exemplary method of calibrating the FCDS of FIG. 3.

FIG. 4 depicts an exemplary method of calibrating the FCDS of FIG. 3. In the depicted method 400 a signal is received 405 to cause the FCDS 300 to enter a calibration mode. The processor 305 may, for example, execute operations stored in NVM 320. The calibration mode may, for example, include a teach mode configured to allow a user to 'teach' one or more correct distances to the sensor. A calibration signal is received 410 corresponding to a true distance (DT) of a calibration target from the FCDS 300. The calibration signal may, for example, correspond to manual input for calibration, programmatic (e.g., on startup, periodic, per measurement cycle) calibration command(s), or some combination thereof.

An expected position vector (VT) is determined 415 corresponding to DT. VT may, for example, be determined by retrieving a position vector from the LUT NVM 310 corresponding to the distance DT. The emitter 110 generates (e.g., as operated by the processor 305) 420 a light signal at the calibration target. A detection signal is received 425 from the receiver 140 corresponding to a position of a reflection of the light signal off the target impinging on the receiver 140. A detected position vector (VM) is generated 430 from the detection signal and corresponding to a position of the reflected light signal on the receiver 140.

VM is compared to VT. If a difference between VT and VM is less than a (predetermined) calibration threshold (TH) 435, then no calibration is needed, and the process ends. If the difference is not below TH 435, then a calibration constant (C) is generated 440. In the depicted example, C is a position vector (e.g., pixel) shift (substantially) equal to a difference between VT and VM. C is then stored 445 (in NVM module 325) and the calibration process ends. Accordingly, C may be accessed for application (e.g., addition, subtraction) to a measured position vector (e.g., VM) to generate a calibrated position vector such that a determined distance is calibrated to reduce or eliminate an error between the measured distance and an actual distance.

Figure 5:
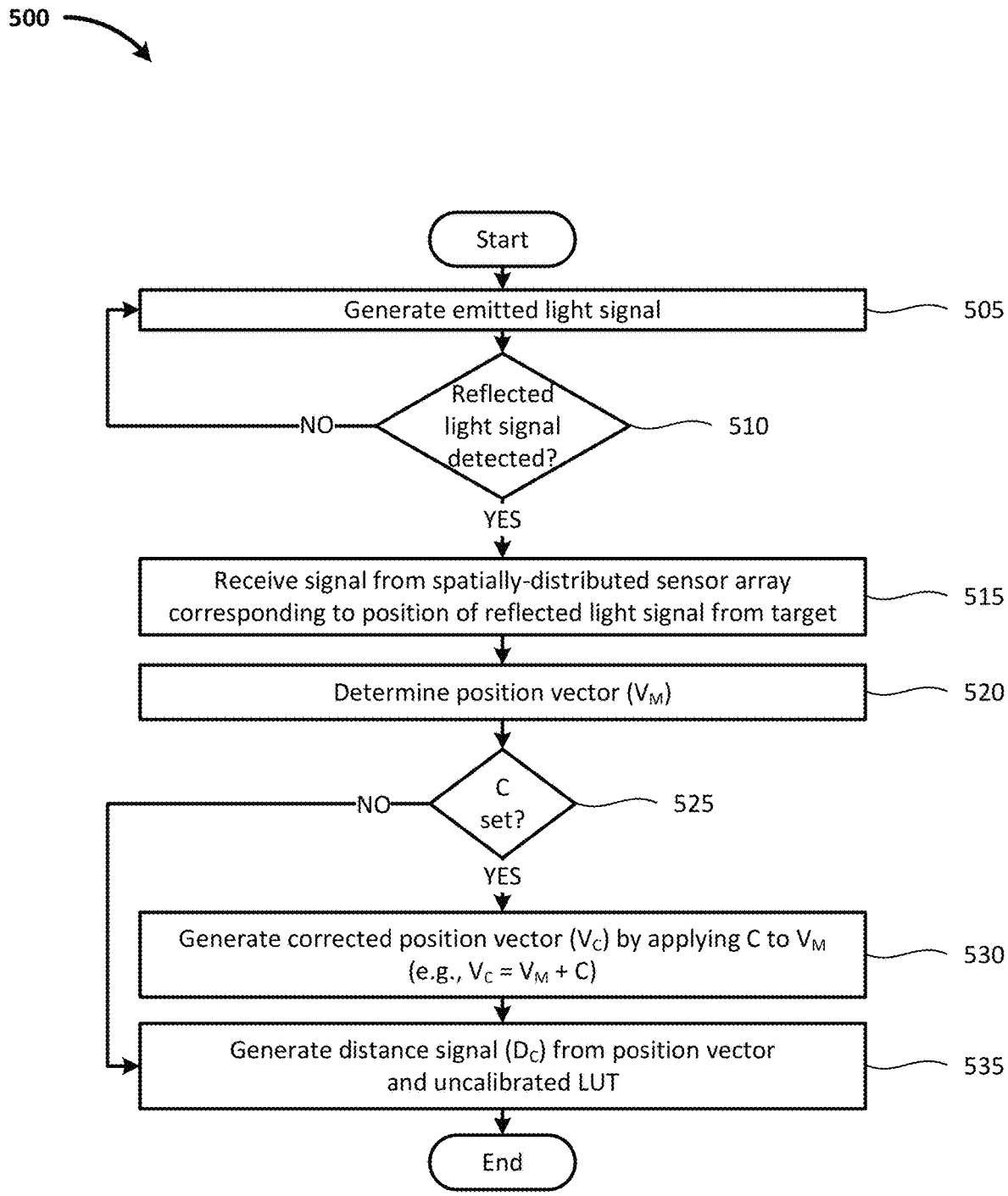
FIG. 5 depicts an exemplary method of operating the FCDS of FIG. 3 to determine distance by applying the sensor position vector calibration constant.

FIG. 5 depicts an exemplary method of operating the FCDS of FIG. 3 to determine distance by applying the sensor position vector calibration constant. In the depicted method 500, an emitted light signal is generated 505 by emitter 110. The processor 305 may, for example, execute operations stored in NVM 315 to operate the emitter 110 and/or to perform other runtime operations. If a reflected light signal is not detected 510 on the receiver 140, then the method returns to step 505. If a reflected light signal is detected 510, then a detection signal is received 515 from the receiver 140 corresponding to a position of the reflected light signal from a measurement target on the receiver 140. A measured position vector VM is determined 520 from the detection signal.

If a calibration constant C is set 525 (e.g., generated by the method 400, stored in the NVM module 325, and/or loaded into the RAM module 330), then a corrected position vector VC is generated 530 by applying C to VM. For example, as depicted, VC=VM+C. Once the corrected position vector is generated 530, then a distance signal (DC) is generated 535 from the corrected position vector VC. If C is not set 525 (e.g., no calibration has been performed, no calibration is required), then DC is generated 535 from the measured position vector VM. For example, DC may be generated by retrieving a distance corresponding to the position vector from the LUT NVM 310. Accordingly, a (calibrated) distance may be advantageously determined from a position of a reflected signal on the receiver 140. The distance may, for example, be advantageously calibrated by application of a calibration constant.

Figure 6:
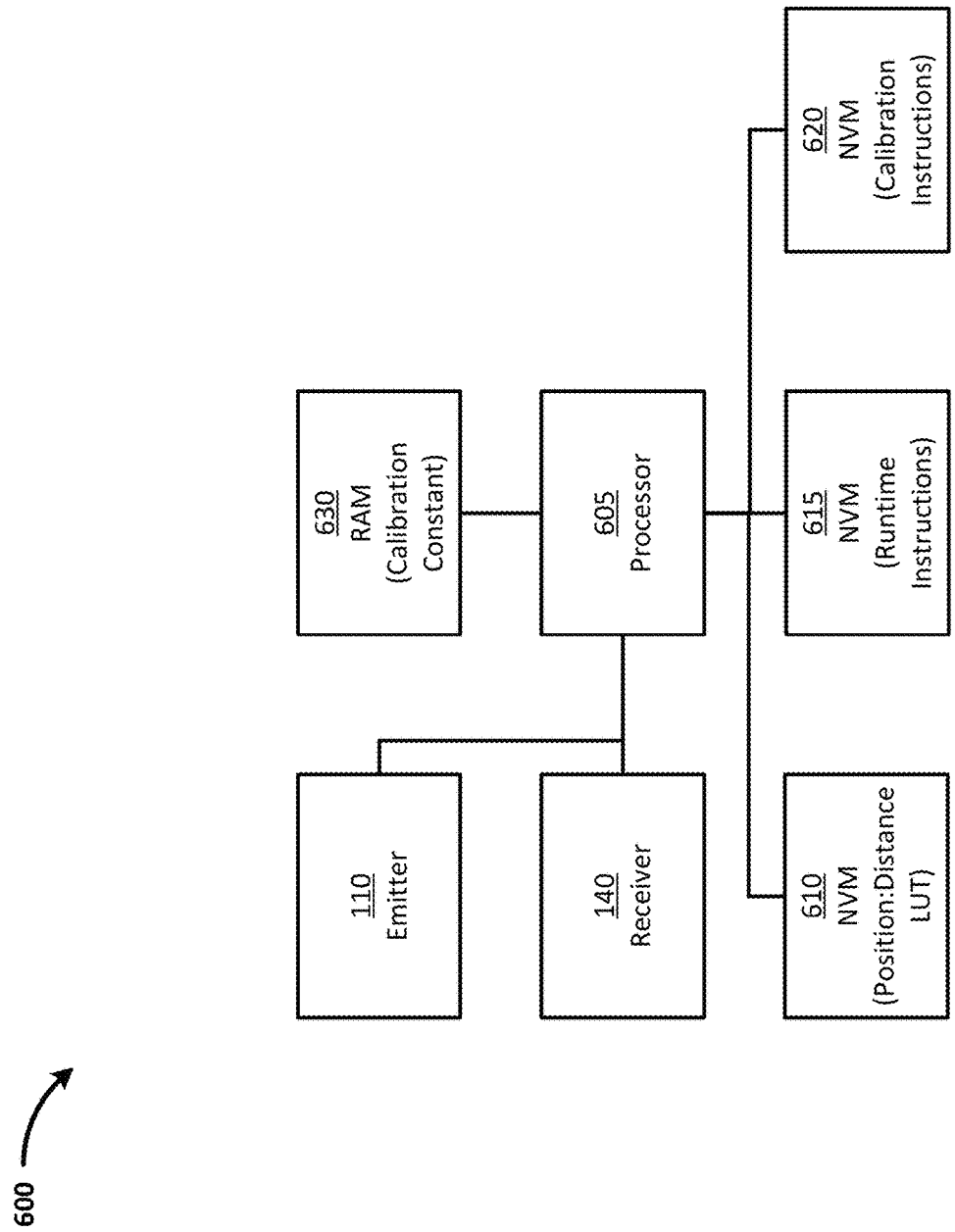
FIG. 6 depicts an exemplary block diagram of an FCDS configured to generate a calibrated distance lookup table from a sensor position vector calibration constant.

FIG. 6 depicts an exemplary block diagram of an FCDS configured to generate a calibrated distance lookup table from a sensor position vector calibration constant. The depicted FCDS system 600 includes a processor 605. The processor 605 is operably coupled to (e.g., in electrical communication with) the emitter 110 and the receiver (e.g., a spatially distributed receiver array) 140. The processor 605 is operably coupled at least to (e.g., in electrical communication with) non-volatile memory (NVM) modules 610, 615, and 620. In various embodiments NVM modules may be combined and/or additional NVM modules may be provided.

In the depicted example, NVM module 610 is a position: distance lookup table (LUT). The lookup table may, for example, map each of multiple position vectors identifying a location of a REMS on the receiver 140 to a corresponding measured distance value. The NVM module 615 includes a program of operations configured to be executed as runtime instructions on the processor 605. The runtime instructions may, for example, be configured to cause the processor 605 to perform runtime operations described at least with reference to FIG. 8. The NVM module 620 includes a program of operations configured to be executed as calibration (e.g., teach mode) instructions on the processor 605. The calibration instructions may, for example, be configured to cause the processor 605 to perform calibration operations described at least with reference to FIG. 7.

In the depicted example the processor 305 is operably coupled to a random access memory (RAM) module 630. In various embodiments RAM modules may be combined and/or additional RAM modules may be provided. As depicted the RAM module 630 includes the calibration constant at least part of the time such as, for example, when generated during calibration operations.

Figure 7:
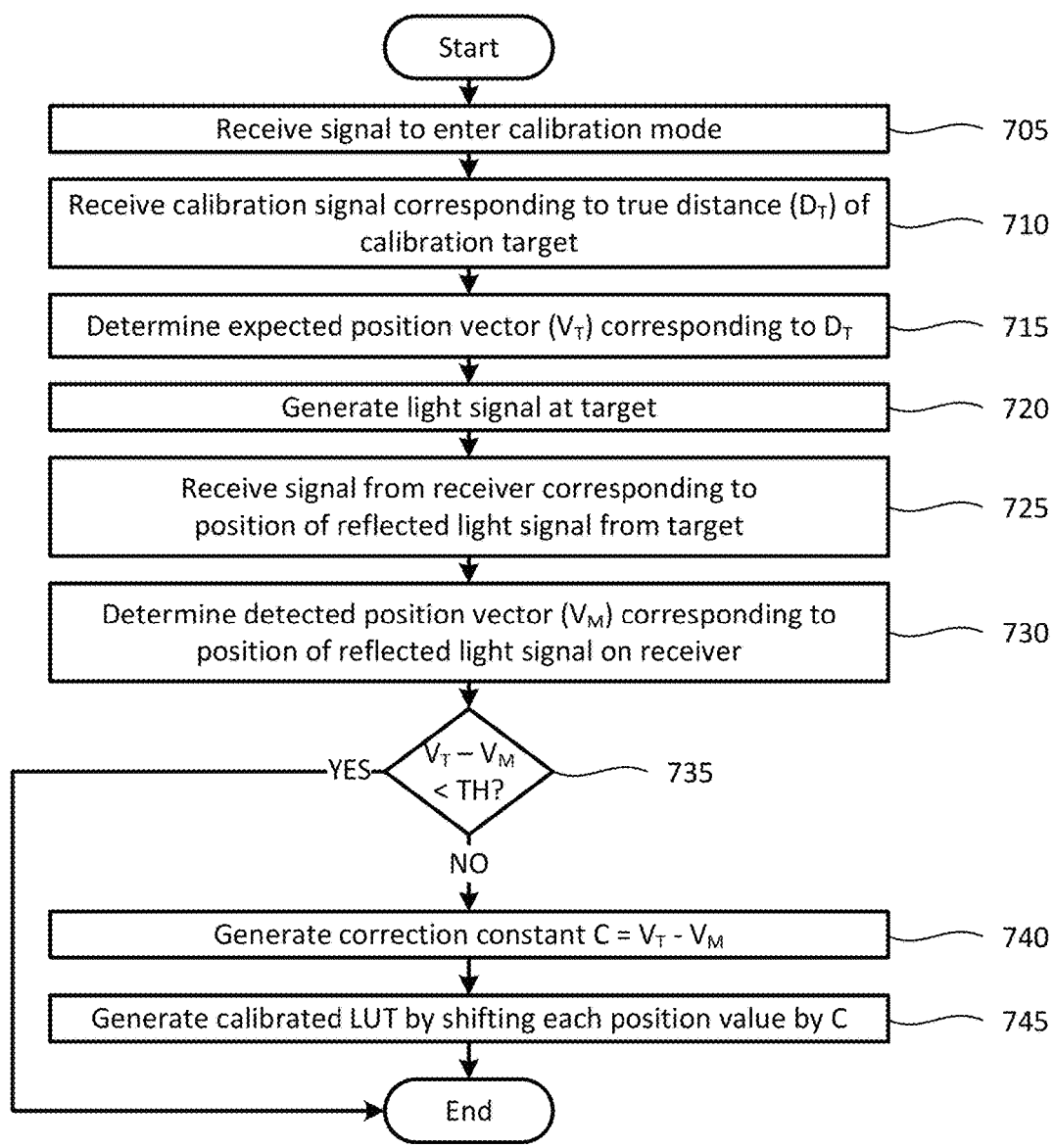
FIG. 7 depicts an exemplary method of calibrating the FCDS of FIG. 6.

FIG. 7 depicts an exemplary method of calibrating the FCDS of FIG. 6. In the depicted method 700 a signal is received 705 to cause the FCDS 600 to enter a calibration mode. The processor 605 may, for example, execute operations stored in NVM 620. The calibration mode may, for example, include a teach mode configured to allow a user to 'teach' one or more correct distances to the sensor. A calibration signal is received 710 corresponding to a true distance (DT) of a calibration target from the FCDS 600. The calibration signal may, for example, correspond to manual input for calibration, programmatic (e.g., on startup, periodic, per measurement cycle) calibration command(s), or some combination thereof.

An expected position vector (VT) is determined 715 corresponding to DT. VT may, for example, be determined by retrieving a position vector from the LUT NVM 610 corresponding to the distance DT. The emitter 110 generates (e.g., as operated by the processor 605) 720 a light signal at the calibration target. A detection signal is received 725 from the receiver 140 corresponding to a position of a reflection of the light signal off the target impinging on the receiver 140. A detected position vector (VM) is generated 730 from the detection signal and corresponding to a position of the reflected light signal on the receiver 140.

VM is compared to VT. If a difference between VT and VM is less than a (predetermined) calibration threshold (TH) 735, then no calibration is needed, and the process ends. If the difference is not below TH 735, then a calibration constant (C) is generated 740. In the depicted example, C is a position vector (e.g., pixel) shift (substantially) equal to a difference between VT and VM. C is then applied to the stored LUT in NVM 610 to generate a calibrated LUT by shifting each position value in the LUT by C. The calibrated LUT may, by way of example and not limitation, overwrite the previously stored LUT in NVM 610 and/or may be stored in a memory module. Accordingly, a calibrated LUT may be accessed to determine a calibrated distance as a function of a measured position vector. The calibrated LUT may advantageously reduce or eliminate an error between the measured distance and an actual distance while minimizing and/or eliminating runtime performance costs.

Figure 8:
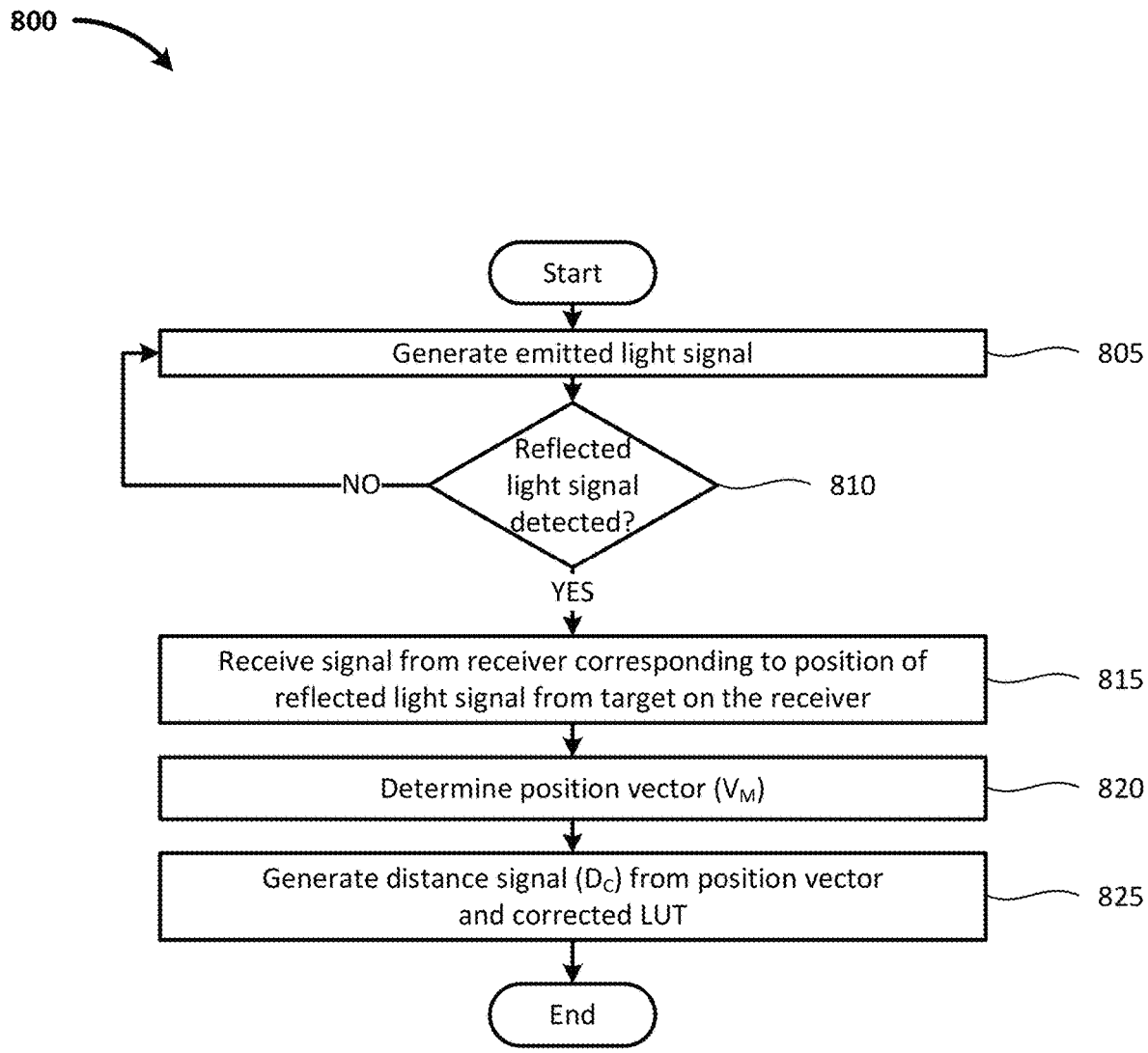
FIG. 8 depicts an exemplary method of operating the FCDS of FIG. 6 to determine distance by retrieving a calibrated distance from the calibrated distance lookup table.

FIG. 8 depicts an exemplary method of operating the FCDS of FIG. 6 to determine distance by retrieving a calibrated distance from the calibrated distance lookup table. In the depicted method 800, an emitted light signal is generated 805 by emitter 110. The processor 805 may, for example, execute operations stored in NVM 615 to operate the emitter 110 and/or to perform other runtime operations. If a reflected light signal is not detected 810 on the receiver 140, then the method returns to step 805. If a reflected light signal is detected 810, then a detection signal is received 815 from the receiver 140 corresponding to a position of the reflected light signal from a measurement target on the receiver 140. A measured position vector VM is determined 820 from the detection signal.

A distance signal (DC) is generated 835 from the measured position vector VM. For example, DC may be generated by retrieving a distance corresponding to the position vector from a calibrated LUT generated as disclosed at least with reference to FIG. 7 (e.g., retrieved from NVM 610). Accordingly, a (calibrated) distance may be advantageously determined from a position of a reflected signal on the receiver 140. The distance may, for example, be advantageously calibrated with minimal or no runtime performance impact by using a calibrated lookup table.

Figure 9:
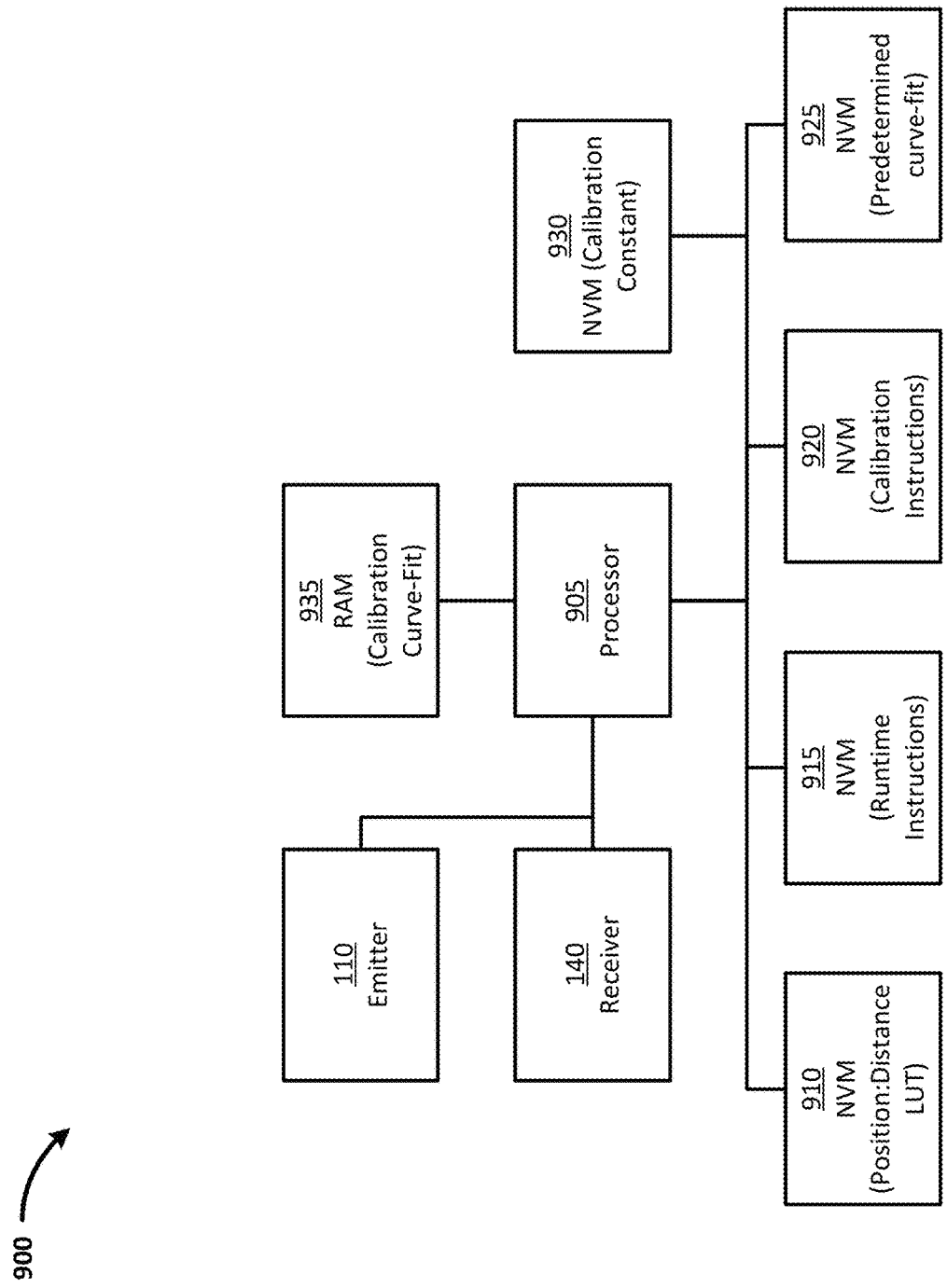
FIG. 9 depicts an exemplary block diagram of an FCDS configured to generate a distance sensor characteristic curve-fit calibration constant.

FIG. 9 depicts an exemplary block diagram of an FCDS configured to generate a distance sensor characteristic curve-fit calibration constant. The depicted FCDS system 900 includes a processor 905. The processor 905 is operably coupled to (e.g., in electrical communication with) the emitter 110 and the receiver (e.g., a spatially distributed receiver array) 140. The processor 905 is operably coupled at least to (e.g., in electrical communication with) non-volatile memory (NVM) modules 910, 915, 920, 925, and 930. In various embodiments NVM modules may be combined and/or additional NVM modules may be provided.

In the depicted example, NVM module 910 is a position: distance lookup table (LUT). The lookup table may, for example, map each of multiple position vectors identifying a location of a REMS on the receiver 140 to a corresponding measured distance value. The NVM module 915 includes a program of operations configured to be executed as runtime instructions on the processor 905. The runtime instructions may, for example, be configured to cause the processor 905 to perform runtime operations described at least with reference to FIG. 11. The NVM module 920 includes a program of operations configured to be executed as calibration (e.g., teach mode) instructions on the processor 905. The calibration instructions may, for example, be configured to cause the processor 905 to perform calibration operations described at least with reference to FIG. 10.

In the depicted example, the NVM module 925 includes a predetermined curve-fit relationship. The curve-fit relationship may, by way of example and not limitation, include a predetermined relationship between error and distance, error and position (e.g., pixel), other appropriate relationship, or some combination thereof. In various embodiments the curve-fit relationship may, by way of example and not limitation, include linear, polynomial, exponential, logarithmic, other appropriate function components, or some combination thereof. The NVM module 930 includes a calibration constant (e.g., C), which may be determined during calibration operations. In various embodiments the predetermined curve-fit may be updated (e.g., during calibration operations) based on the calibration constant and the result stored in a single memory module.

In the depicted example the processor 905 is operably coupled to a random access memory (RAM) module 935. In various embodiments RAM modules may be combined and/or additional RAM modules may be provided. As depicted the RAM module 935 includes the calibration curve-fit relationship at least part of the time such as, for example, when generated during calibration operations and/or during runtime operations applying the calibration constant. For example, the calibration curve-fit relationship may be a function of the predetermined curve-fit stored in the NVM module 925 and the calibration constant stored in the NVM module 930.

Figure 10:
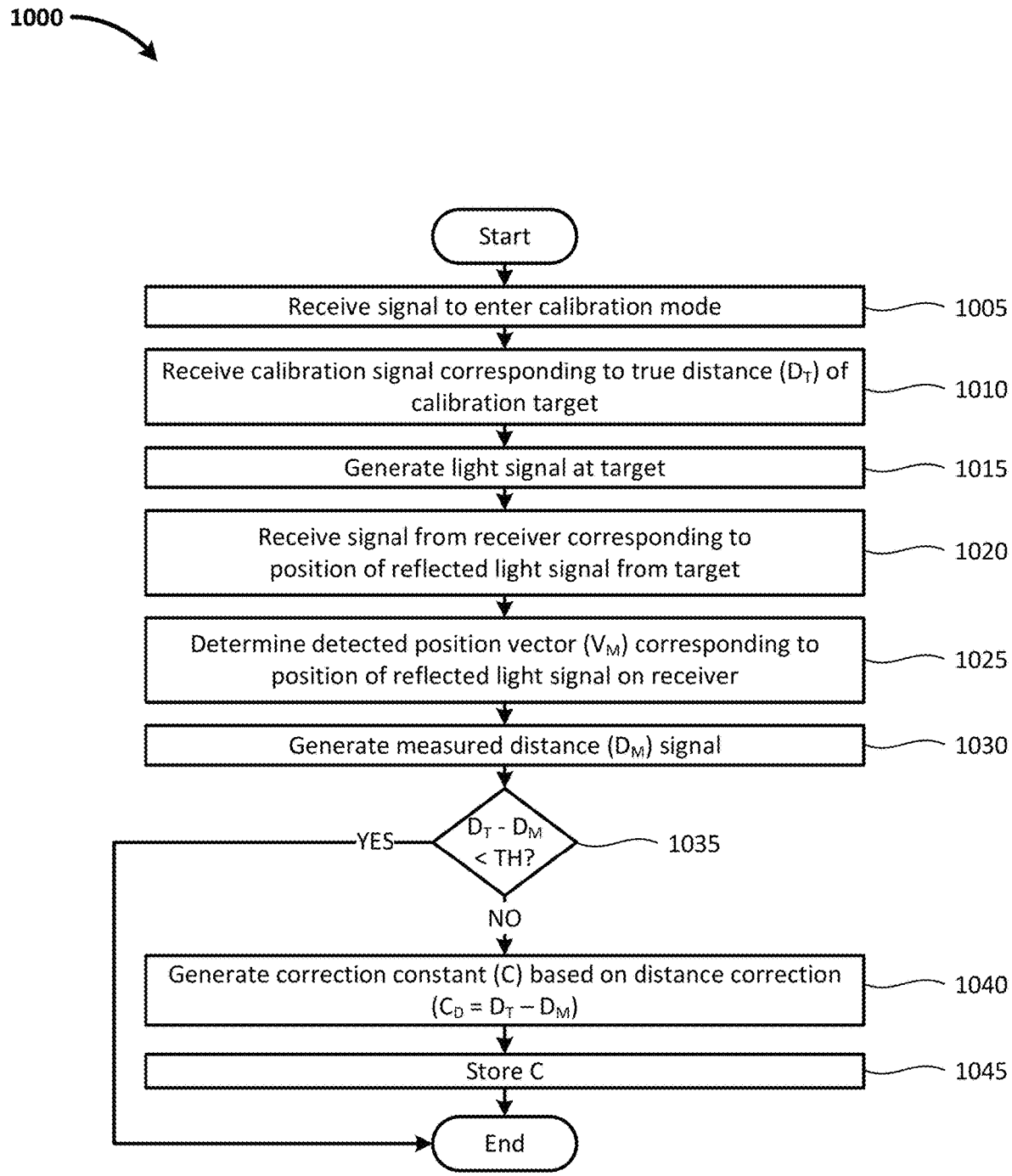
FIG. 10 depicts an exemplary method of calibrating the FCDS of FIG. 9.

FIG. 10 depicts an exemplary method of calibrating the FCDS of FIG. 9. In the depicted method 1000 a signal is received 1005 to cause the FCDS 900 to enter a calibration mode. The processor 905 may, for example, execute operations stored in NVM 920. The calibration mode may, for example, include a teach mode configured to allow a user to 'teach' one or more correct distances to the sensor. A calibration signal is received 1010 corresponding to a true distance (DT) of a calibration target from the FCDS 900. The calibration signal may, for example, correspond to manual input for calibration, programmatic (e.g., on startup, periodic, per measurement cycle) calibration command(s), or some combination thereof.

The emitter 110 generates (e.g., as operated by the processor 905) 1015 a light signal at the calibration target. A detection signal is received 1020 from the receiver 140 corresponding to a position of a reflection of the light signal off the target impinging on the receiver 140. A detected position vector (VM) is generated 1025 from the detection signal and corresponding to a position of the reflected light signal on the receiver 140. A measured distance signal (DM) is generated 1030 from VM. For example, DM may be generated by retrieving a distance value from the LUT in NVM module 910 as a function of VM.

DM is compared to DT. If a difference between DM and DT is less than a (predetermined) calibration threshold (TH) 1035, then no calibration is needed, and the process ends. If the difference is not below TH 1035, then a calibration constant (C) is generated 1040. In the depicted example, C is generated according to a correction distance (CD) substantially equal to a difference between DT and DM. For example, C may be a (scaling) factor of a (second order) polynomial curve-fit equation (e.g., stored in NVM module 925) defining a predetermined characteristic profile of the sensor. C is then stored 1045 (in NVM module 930) and the calibration process ends. Accordingly, C may be accessed for application (e.g., scaling) with a characteristic profile (e.g., a curve-fit equation stored in the NVM 925) to a measured distance to generate a calibrated distance. Accordingly, the calibrated distance measurement may reduce or eliminate an error between the measured distance and an actual distance.

Figure 11:
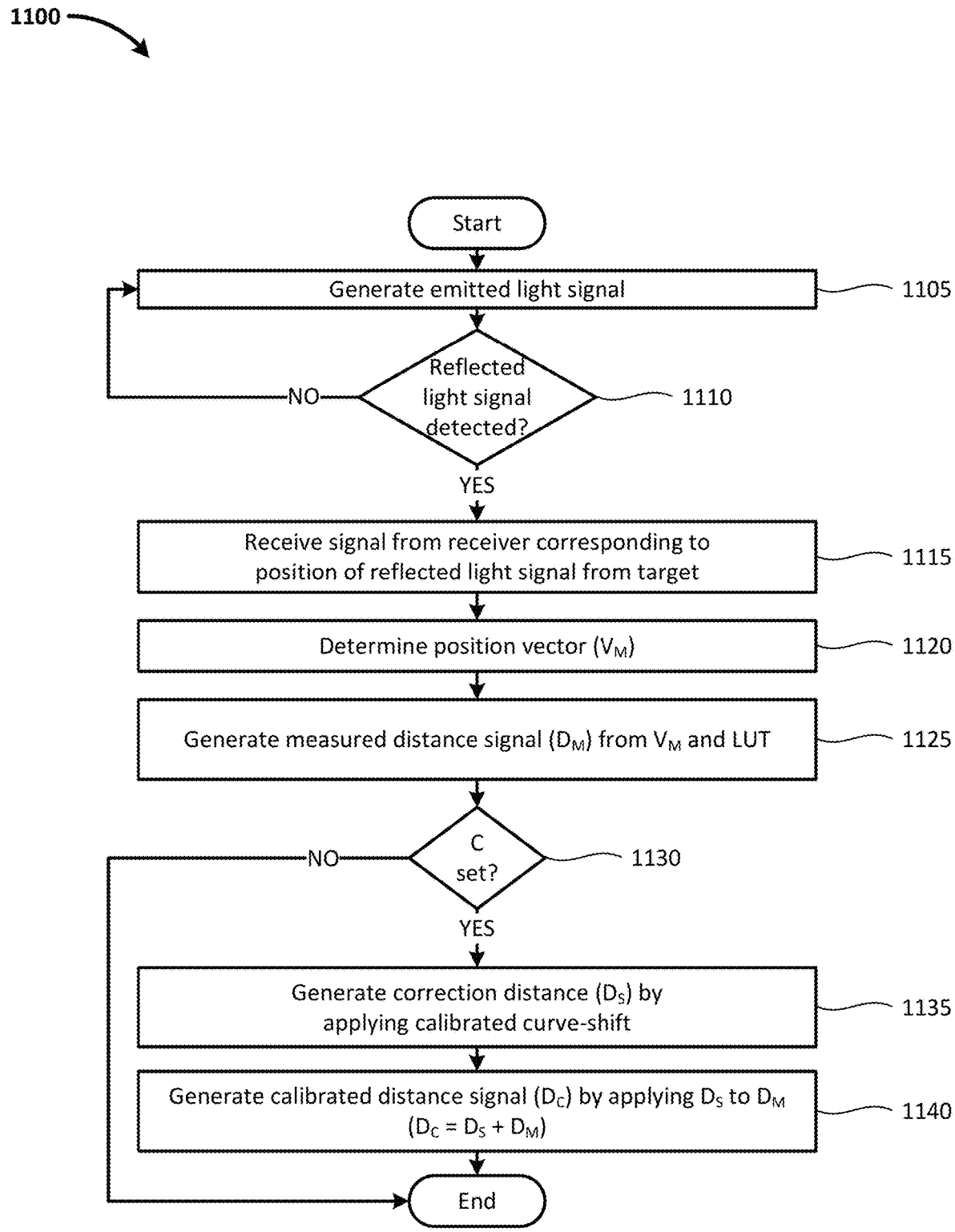
FIG. 11 depicts an exemplary method of operating the FCDS of FIG. 9 to determine distance by determining a distance correction by applying the curve-fit calibration constant.

FIG. 11 depicts an exemplary method of operating the FCDS of FIG. 9 to determine distance by determining a distance correction by applying the curve-fit calibration constant. In the depicted method 1100, an emitted light signal is generated 1105 by emitter 110. The processor 905 may, for example, execute operations stored in NVM 915 to operate the emitter 110 and/or to perform other runtime operations. If a reflected light signal is not detected 1110 on the receiver 140, then the method returns to step 1105. If a reflected light signal is detected 1110, then a detection signal is received 1115 from the receiver 140 corresponding to a position of the reflected light signal from a measurement target on the receiver 140. A measured position vector VM is determined 1120 from the detection signal. A measured distance signal (DM) is generated 1125 from VM and the LUT stored in the NVM module 910. For example, the processor 905 may retrieve DM from the LUT as a function of VM.

If a calibration constant C is set 1130 (e.g., generated by the method 1000, stored in the NVM module 925, and/or loaded into the RAM module 930), then a correction distance (DS) is generated 1135 by applying the calibrated (e.g., by C) characteristic profile (e.g., curve-fit relationship) to DM. For example, DS may be an output of a characteristic profile relationship depending on inputs DM and C. Once the corrected distance is generated 1135, then a calibrated distance signal (DC) is generated 1140 from DM and DS, and DC may be output as the final measured distance. If C is not set 1130 (e.g., no calibration has been performed, no calibration is required), then no correction is applied, and DM may be output as the final measured distance. Accordingly, a (calibrated) distance may be advantageously determined from a position of a reflected signal on the receiver 140. The distance may, for example, be advantageously calibrated by application of a calibrated sensor characteristic profile.

Figure 12:
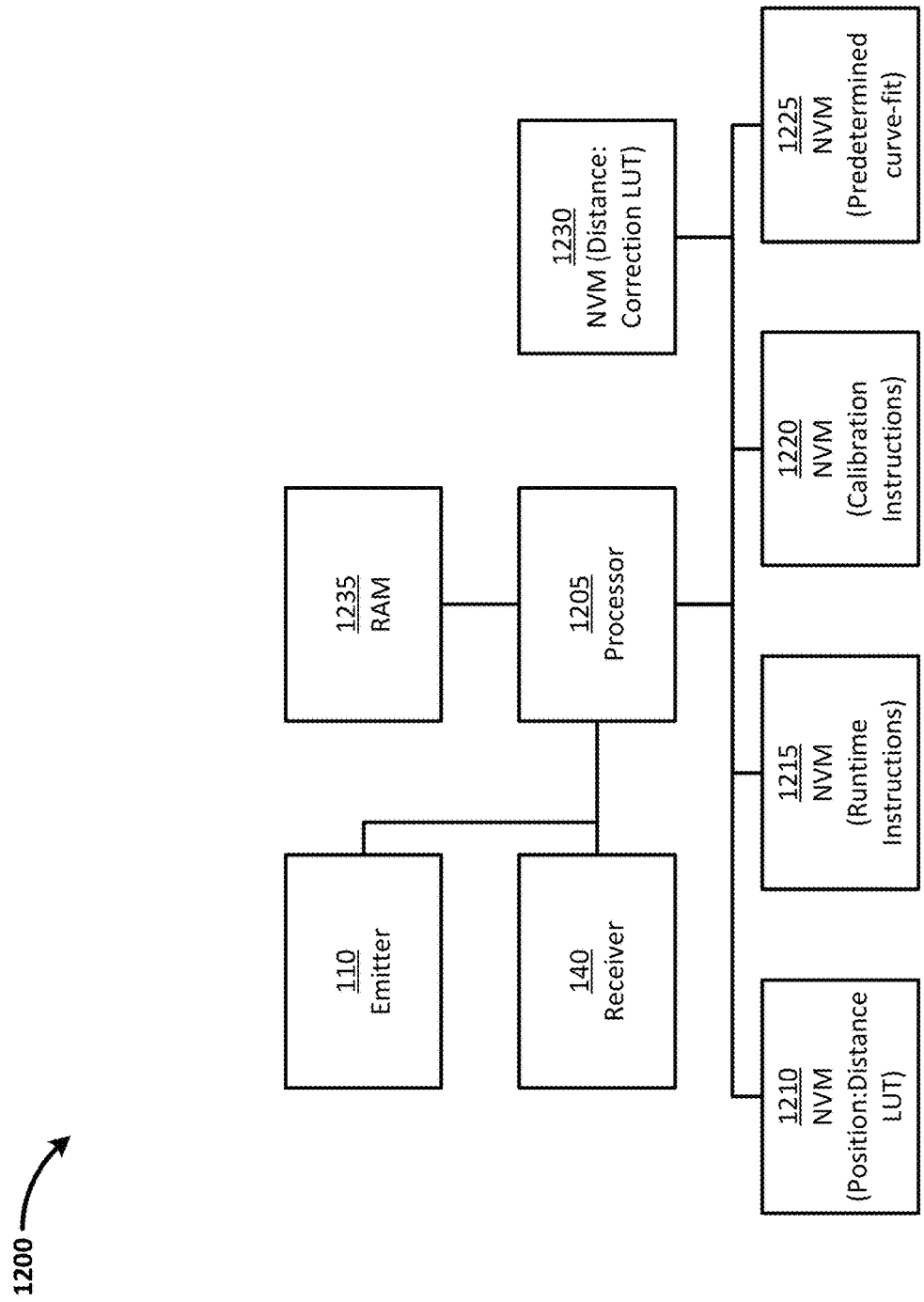
FIG. 12 depicts an exemplary block diagram of an FCDS configured to generate a distance correction lookup table.

FIG. 12 depicts an exemplary block diagram of an FCDS configured to generate a distance correction lookup table. The depicted FCDS system 1200 includes a processor 1205. The processor 1205 is operably coupled to (e.g., in electrical communication with) the emitter 110 and the receiver (e.g., a spatially distributed receiver array) 140. The processor 1205 is operably coupled at least to (e.g., in electrical communication with) non-volatile memory (NVM) modules 1210, 1215, 1220, 1225, and 1230. In various embodiments NVM modules may be combined and/or additional NVM modules may be provided.

In the depicted example, NVM module 1210 is a position: distance lookup table (LUT). The lookup table may, for example, map each of multiple position vectors identifying a location of a REMS on the receiver 140 to a corresponding measured distance value. The NVM module 1215 includes a program of operations configured to be executed as runtime instructions on the processor 1205. The runtime instructions may, for example, be configured to cause the processor 1205 to perform runtime operations described at least with reference to FIG. 14. The NVM module 1220 includes a program of operations configured to be executed as calibration (e.g., teach mode) instructions on the processor 1205. The calibration instructions may, for example, be configured to cause the processor 1205 to perform calibration operations described at least with reference to FIG. 13.

In the depicted example, the NVM module 1225 includes a predetermined curve-fit relationship. The curve-fit relationship may, by way of example and not limitation, include a predetermined relationship between error and distance, error and position (e.g., pixel), other appropriate relationship, or some combination thereof. In various embodiments the curve-fit relationship may, by way of example and not limitation, include linear, polynomial, exponential, logarithmic, other appropriate function components, or some combination thereof. The NVM module 1230 includes a calibration constant (e.g., C), which may be determined during calibration operations. In various embodiments the predetermined curve-fit may be updated (e.g., during calibration operations) based on the calibration constant and the result stored in a single memory module.

In the depicted example the processor 1205 is operably coupled to a random access memory (RAM) module 1235. In various embodiments RAM modules may be combined and/or additional RAM modules may be provided.

Figure 13:
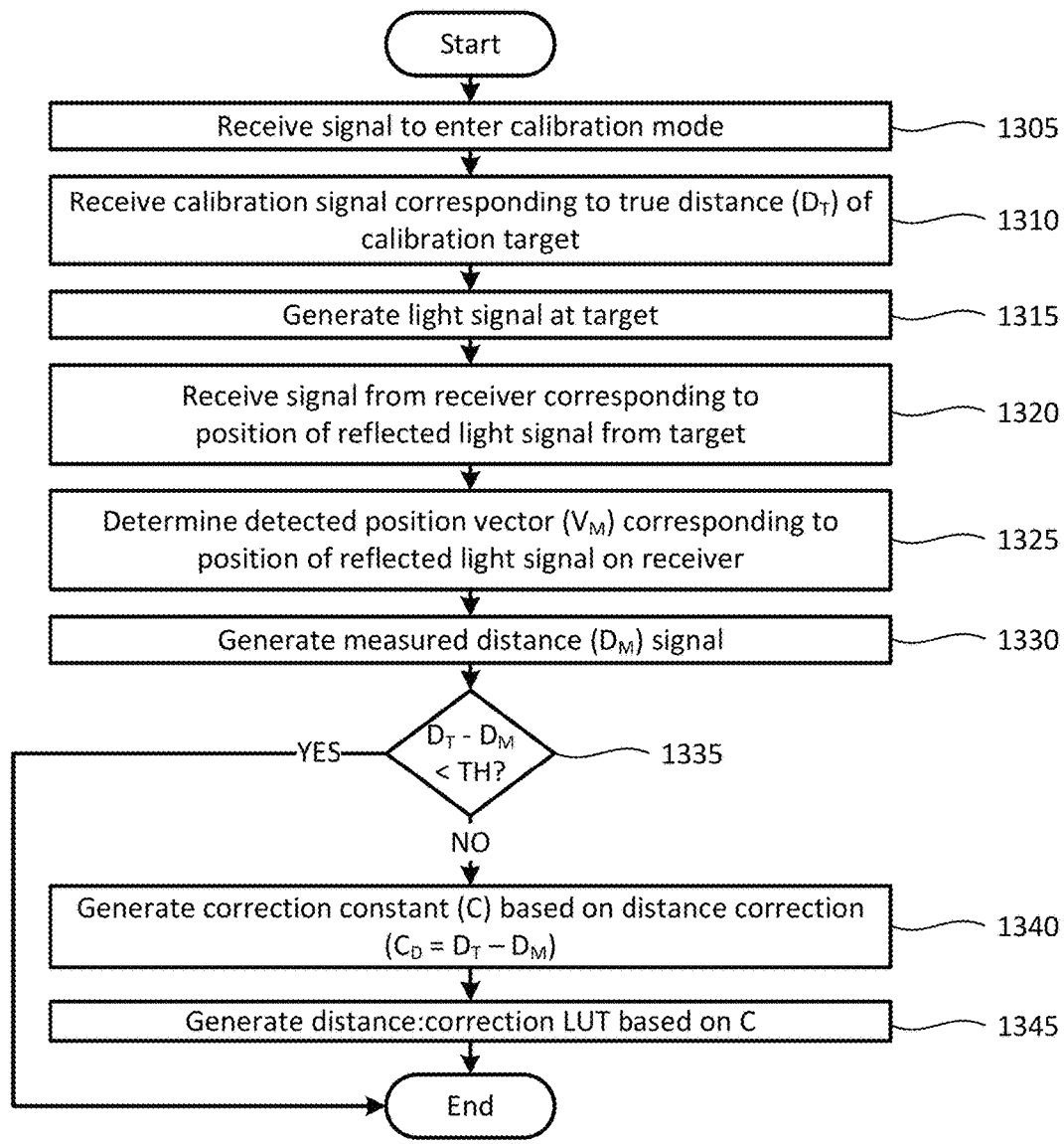
FIG. 13 depicts an exemplary method of calibrating the FCDS of FIG. 12.

FIG. 13 depicts an exemplary method of calibrating the FCDS of FIG. 12. In the depicted method 1300 a signal is received 1305 to cause the FCDS 1200 to enter a calibration mode. The processor 1205 may, for example, execute operations stored in NVM 1220. The calibration mode may, for example, include a teach mode configured to allow a user to 'teach' one or more correct distances to the sensor. A calibration signal is received 1310 corresponding to a true distance (DT) of a calibration target from the FCDS 1200. The calibration signal may, for example, correspond to manual input for calibration, programmatic (e.g., on startup, periodic, per measurement cycle) calibration command(s), or some combination thereof.

The emitter 110 generates (e.g., as operated by the processor 1205) 1315 a light signal at the calibration target. A detection signal is received 1320 from the receiver 140 corresponding to a position of a reflection of the light signal off the target impinging on the receiver 140. A detected position vector (VM) is generated 1325 from the detection signal and corresponding to a position of the reflected light signal on the receiver 140. A measured distance signal (DM) is generated 1330 from VM. For example, DM may be generated by retrieving a distance value from the LUT in NVM module 1210 as a function of VM.

DM is compared to DT. If a difference between DM and DT is less than a (predetermined) calibration threshold (TH) 1335, then no calibration is needed, and the process ends. If the difference is not below TH 1335, then a calibration constant (C) is generated 1340. In the depicted example, C is generated according to a correction distance (CD) substantially equal to a difference between DT and DM. For example, C may be a (scaling) factor of a (second order) polynomial curve-fit equation (e.g., stored in NVM module 1225) defining a predetermined characteristic profile of the sensor. A correction LUT is then generated 1345 (e.g., stored in NVM module 1230) and the calibration process ends. The correction LUT may, for example, be generated by applying a calibrated characteristic profile (e.g., a curve-fit equation stored in the NVM 1225 as calibrated by C) to multiple measured distances (e.g., corresponding to distances in the position:distance LUT stored in the NVM module 1210) to generate a corresponding correction distance. Each measured distance:correction distance pair may then be stored in the correction LUT (e.g., stored in the NVM module 1230).

Accordingly, the correction LUT may be applied to a distance measurement to generate a calibrated distance measurement. Accordingly, the calibration may reduce or eliminate an error between a calibrated measured distance and an actual distance.

In various embodiments the correction LUT may be omitted. A calibrated position:distance LUT may, by way of example and not limitation, be generated by applying a correction (e.g., as discussed in generating the correction LUT). For example, a calibrated position:distance LUT may be generated by, for each of a plurality of distances in the LUT, apply C (e.g., as a coefficient of a characteristic profile) to the distance to generate a calibrated distance. Accordingly, corresponding position vectors in the LUT are advantageously mapped to calibrated distance values. Such embodiments may, for example, advantageously reduce and/or eliminate runtime performance impact of calibration.

Figure 14:
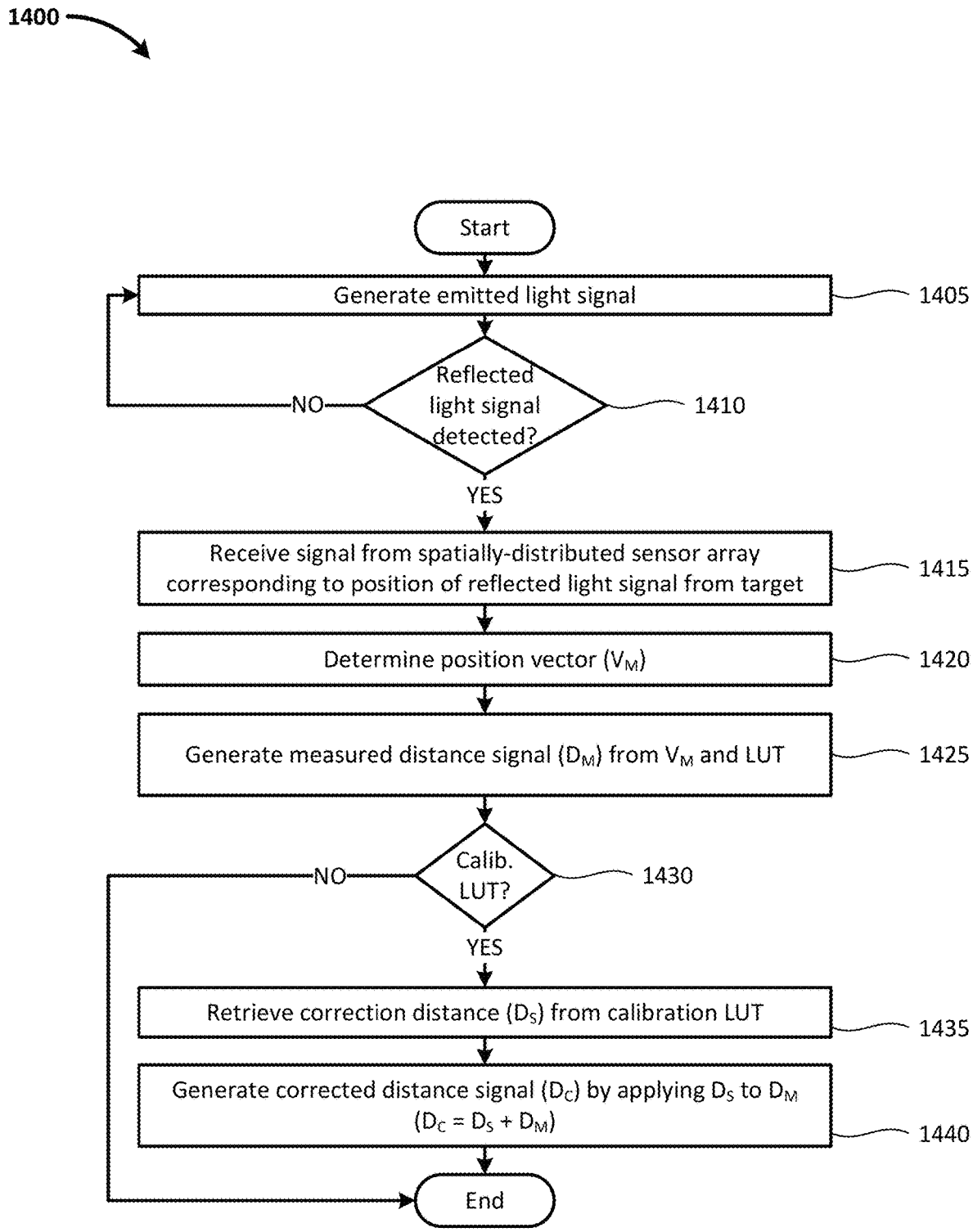
FIG. 14 depicts an exemplary method of operating the FCDS of FIG. 12 to determine distance by applying a distance correction retrieved from the distance correction lookup table.

FIG. 14 depicts an exemplary method of operating the FCDS of FIG. 12 to determine distance by applying a distance correction retrieved from the distance correction lookup table. In the depicted method 1400, an emitted light signal is generated 1405 by emitter 110. The processor 1205 may, for example, execute operations stored in NVM 1215 to operate the emitter 110 and/or to perform other runtime operations. If a reflected light signal is not detected 1410 on the receiver 140, then the method returns to step 1405. If a reflected light signal is detected 1410, then a detection signal is received 1415 from the receiver 140 corresponding to a position of the reflected light signal from a measurement target on the receiver 140. A measured position vector VM is determined 1420 from the detection signal. A measured distance signal (DM) is generated 1425 from VM and the position:distance LUT stored in the NVM module 1210. For example, the processor 1205 may retrieve DM from the LUT as a function of VM. In some embodiments (not illustrated) the processor 1205 may retrieve DM from a calibrated LUT and the process may end.

If a calibration constant C is set 1430 (e.g., generated by the method 1300, stored in the NVM module 1225, and/or loaded into the RAM module 1235), then a correction distance (DS) is generated 1435 by retrieving, from the distance:correction LUT table stored in the NVM module 1230, the correction distance (DS) corresponding to DM. Once the corrected distance is generated 1435, then a calibrated distance signal (DC) is generated 1440 from DM and DS, and DC may be output as the final measured distance. If C is not set 1430 (e.g., no calibration has been performed, no calibration is required), then no correction is applied, and DM may be output as the final measured distance. Accordingly, a (calibrated) distance may be advantageously determined from a position of a reflected signal on the receiver 140. The distance may, for example, be advantageously calibrated by retrieval of a distance correction generated as a function of calibrated sensor characteristic profile.

Figure 15:
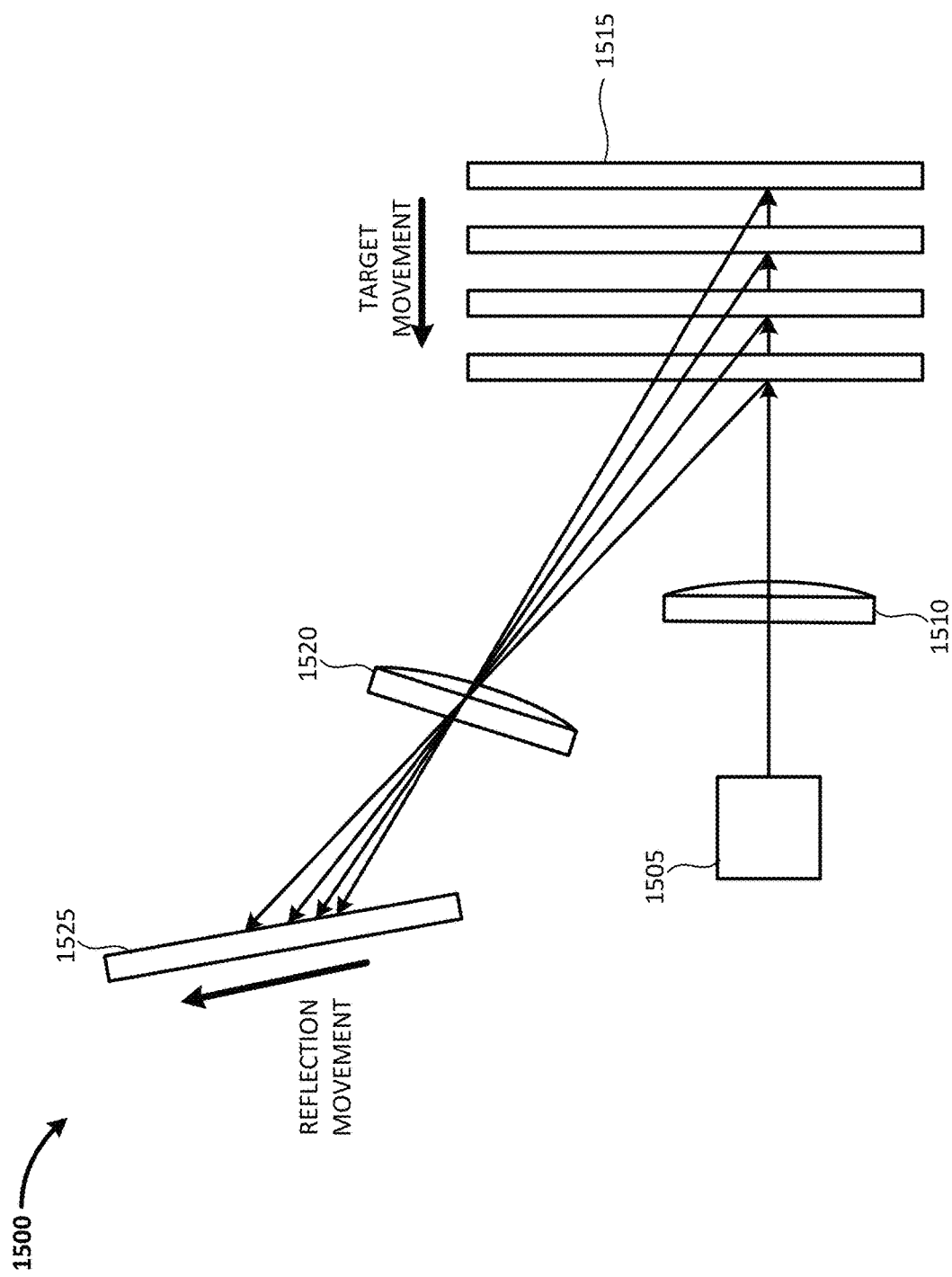
FIG. 15 depicts an exemplary triangulation sensor geometry.

FIG. 15 depicts an exemplary triangulation sensor geometry. In the depicted opto-mechanical system 1500, an emitter 1505 (e.g., LED, laser diode, avalanche photodiode, infrared emitter) emits a light beam through a lens 1510. The light beam reflects off of a target 1515. The reflected beam passes through a lens 1520 (e.g., a collimating lens) onto a receiver 1525. As depicted, as the target 1515 moves towards the sensor, the location of the centroid of the received light moves along the receiver 1525 (e.g., a spatially distributed array) away from the emitter 1505. For conventional purposes, the "far" location of the receiver 1525 is referred to as the portion that is closest to the emitter 1505. As depicted, equal incremental steps of the target 1515 towards the sensor result in increasingly large steps in position of the reflected light beam onto the receiver 1525.

Figure 16:
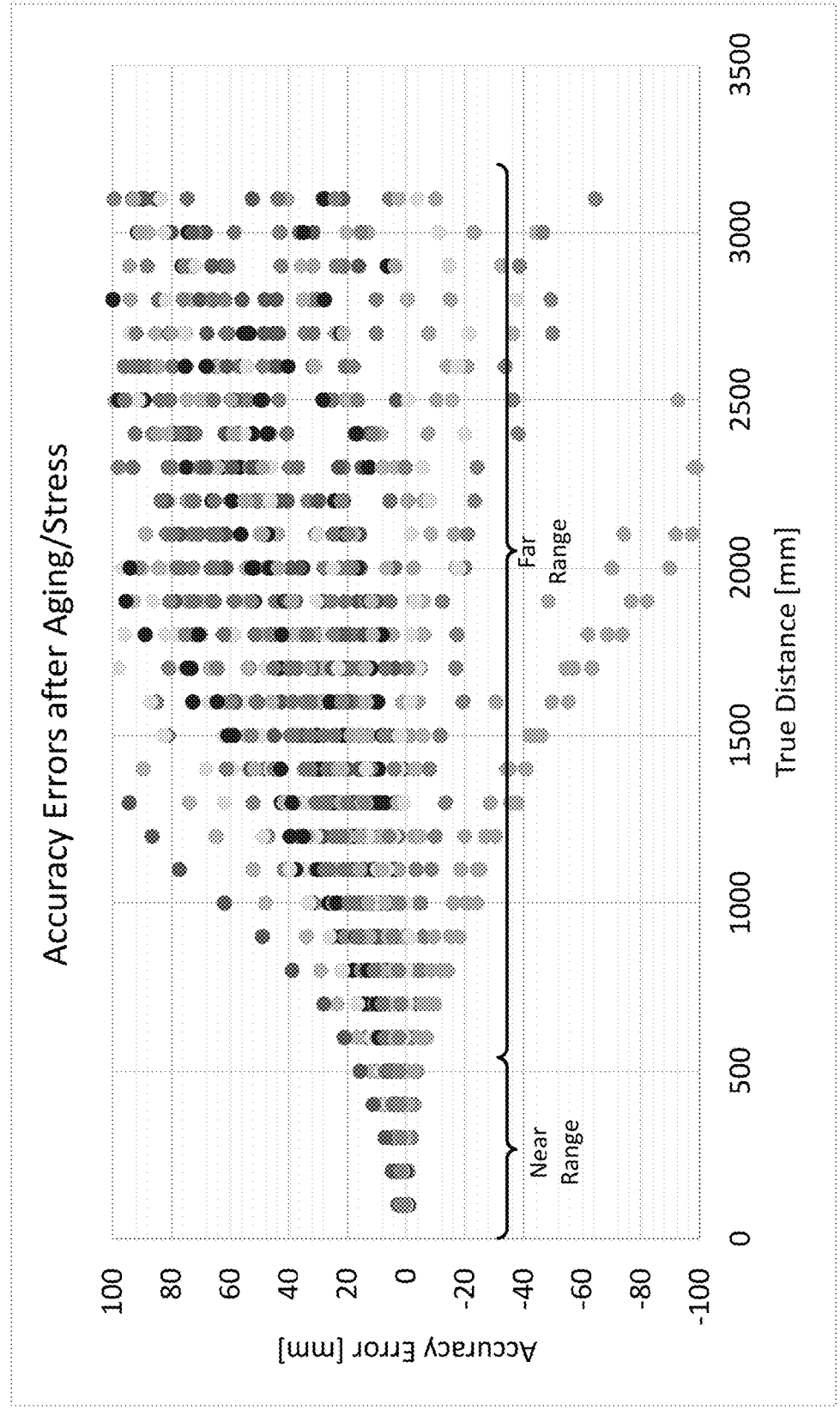
FIG. 16 depicts exemplary accuracy errors in distance sensors after an aging process.

FIG. 16 depicts exemplary accuracy errors in distance sensors after an aging process. In the depicted example, a set of sensors were produced and "seasoned" by aging them naturally and subjecting them to thermal and mechanical stress. After this aging period, the error in the calibration map as a function of distance was observed and recorded. As can be seen in the depicted accuracy (mm) to distance (mm) plot 1600, error increases non-linearly with distance. For example, in a near range (defined in the depicted example as up to about 500 mm), error is less than 20 mm. In a far range (defined in the depicted example as beyond about 500 mm), the error increases non-linearly with distance.

Figure 17A:
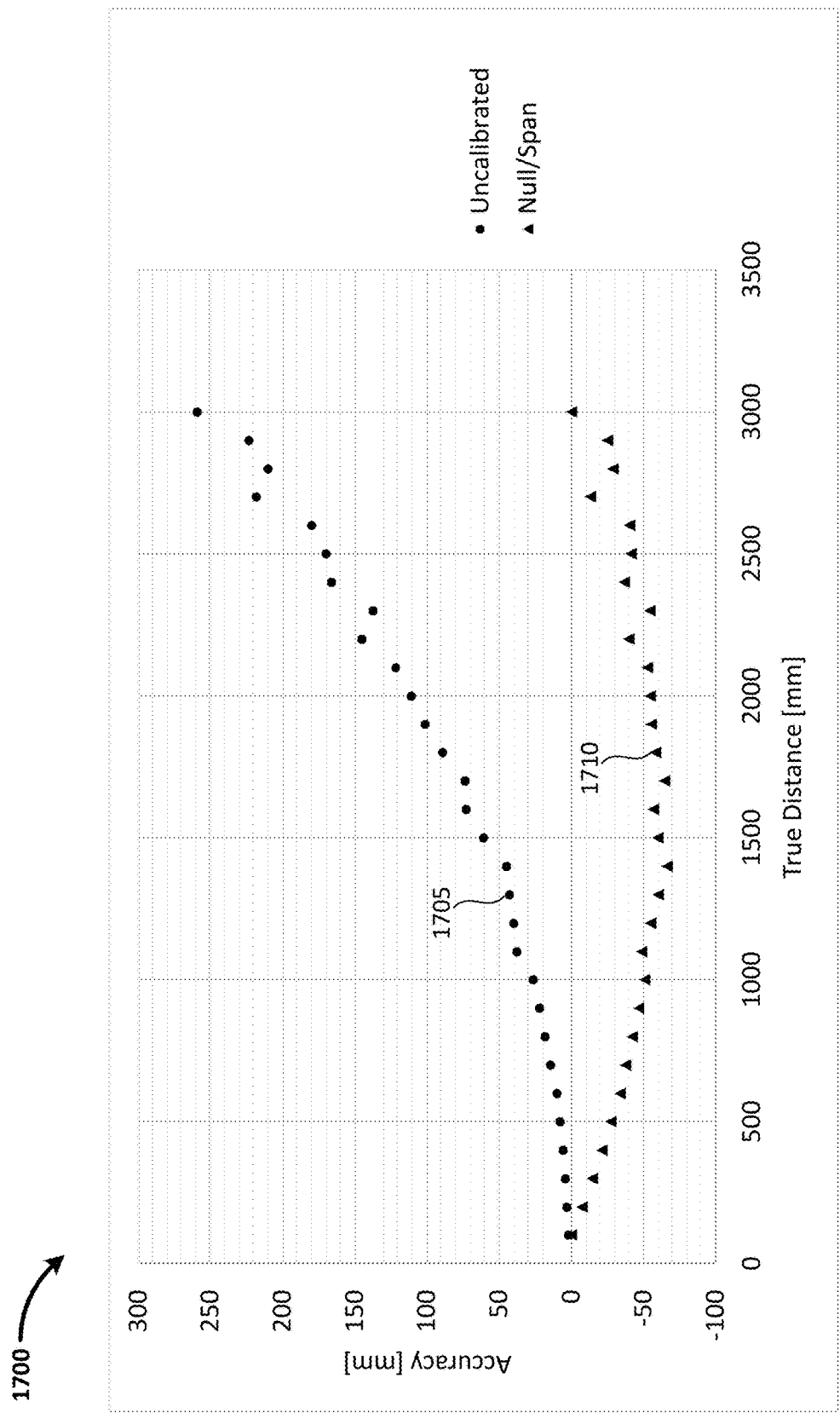
FIG. 17A depicts exemplary results of calibrating using a null/span teach method.

FIG. 17A depicts exemplary results of calibrating using a null/span teach method. In the exemplary accuracy (mm) to distance (mm) plot 1700, accuracy of an uncalibrated aged sensor is shown by scatterplot 1705. Conventional null/span teach calibration is made by 'teaching' the sensor with a target at a known near distance (e.g., nearly 0 mm) and a known far distance (e.g., about 3000 mm). All error is assumed to be linear between the two learning points. A new calibration (e.g., calibration map) is generated correlating distance and position as adjusted by the linear calibration relationship defined by the near and far calibration points. Accuracy of the sensor after the null/span calibration is shown by scatterplot 1710. As can be seen, although the maximum error is reduced (e.g., from about 260 mm at 3000 mm to about −70 mm at about 1400 mm), a greater amount of error is now introduced into portions of the range. For example, in the depicted example the error at about 500 mm is increased from about 10 mm to about 30 mm. Because a linear assumption is made, and a relationship between position of a reflected signal and distance is not linear, then error is now maximized and/or introduced, for example, between the calibration (teach) points.

Figure 17B:
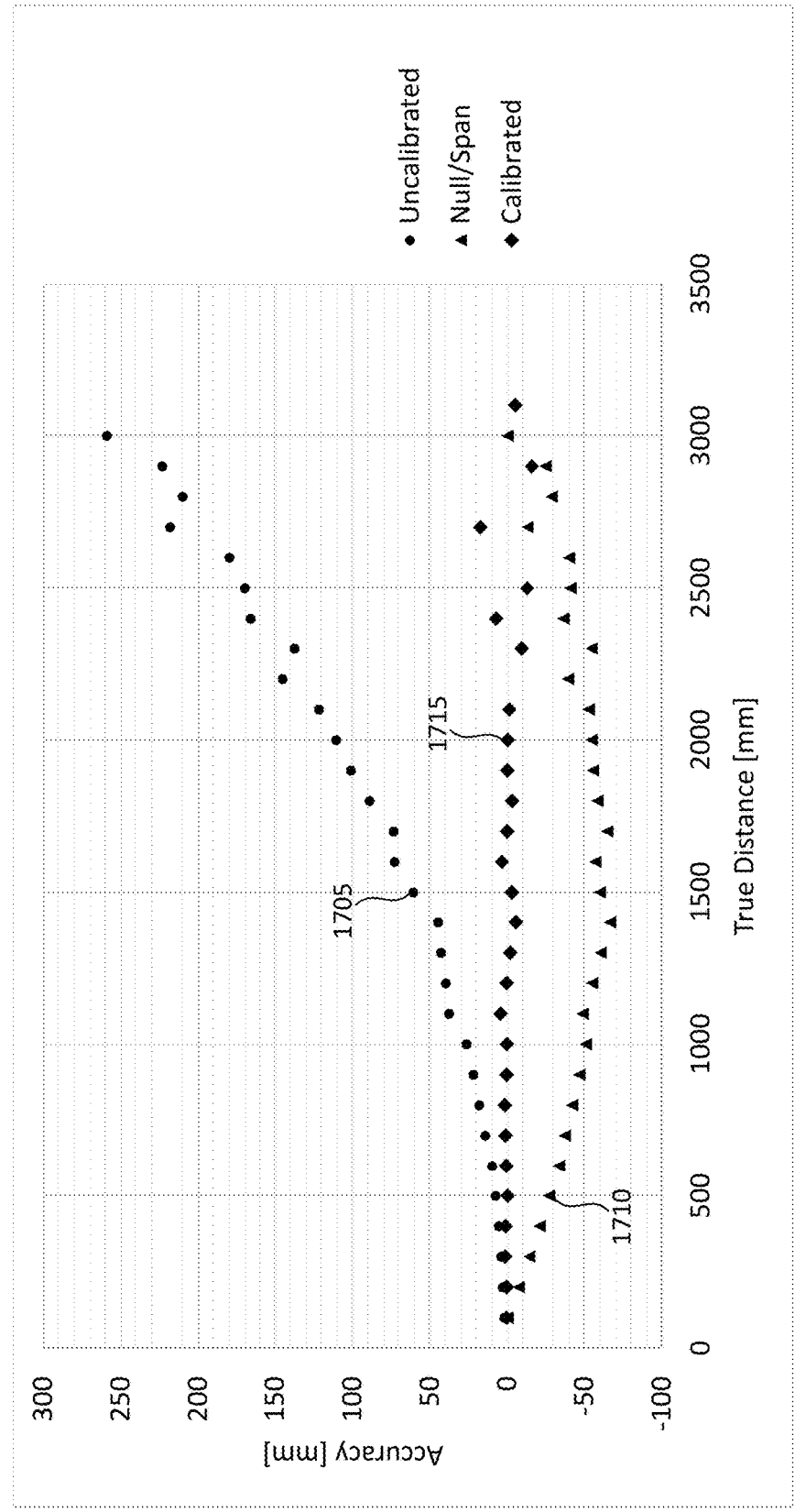
FIG. 17B depicts exemplary results of calibrating the same sensor as shown in FIG. 17A with a constant shift in the position domain.

FIG. 17B depicts exemplary results of calibrating the same sensor as shown in FIG. 17A with a constant shift in the position domain. The (uncalibrated) sensor was calibrated to introduce a substantially constant shift in the position domain. In the depicted example, the uncalibrated sensor was taught using a target at a single known distance, such as disclosed at least with reference to FIG. 4. The known distance was greater than or equal to 500 mm. An expected pixel position of a centroid of a corresponding reflected light beam off the target was determined based on the known distance of the target. The expected pixel position was compared to the actual pixel position of the centroid of the reflected light beam. A pixel position shift (e.g., as a calibration constant) was determined based on the comparison (e.g., a difference between the expected pixel position and the actual pixel position). The pixel position shift (calibration constant) was applied across all distances to uniformly shift the pixel position for each distance by the calibration constant.

The resulting accuracy vs true distance plot is depicted in a comparison plot 1701 by a scatterplot 1715. In the depicted example, the error was reduced to substantially +/−20 mm. Furthermore, substantially no error was introduced in a central region of the distance range as compared to the scatterplot 1710 depicting the null/span teach method applied to the same sensor. Accordingly, various embodiments may advantageously improve accuracy relative to a linear null/span teach method by leveraging the non-linear relationship in the distance domain (e.g., depicted at least by FIG. 15) between distance to a target and position of a reflected light beam off the target onto a receiver. Accordingly, various embodiments may advantageously provide a more accurate and/or simpler (field) calibration method (e.g., using one or more calibration points).

Figure 18:
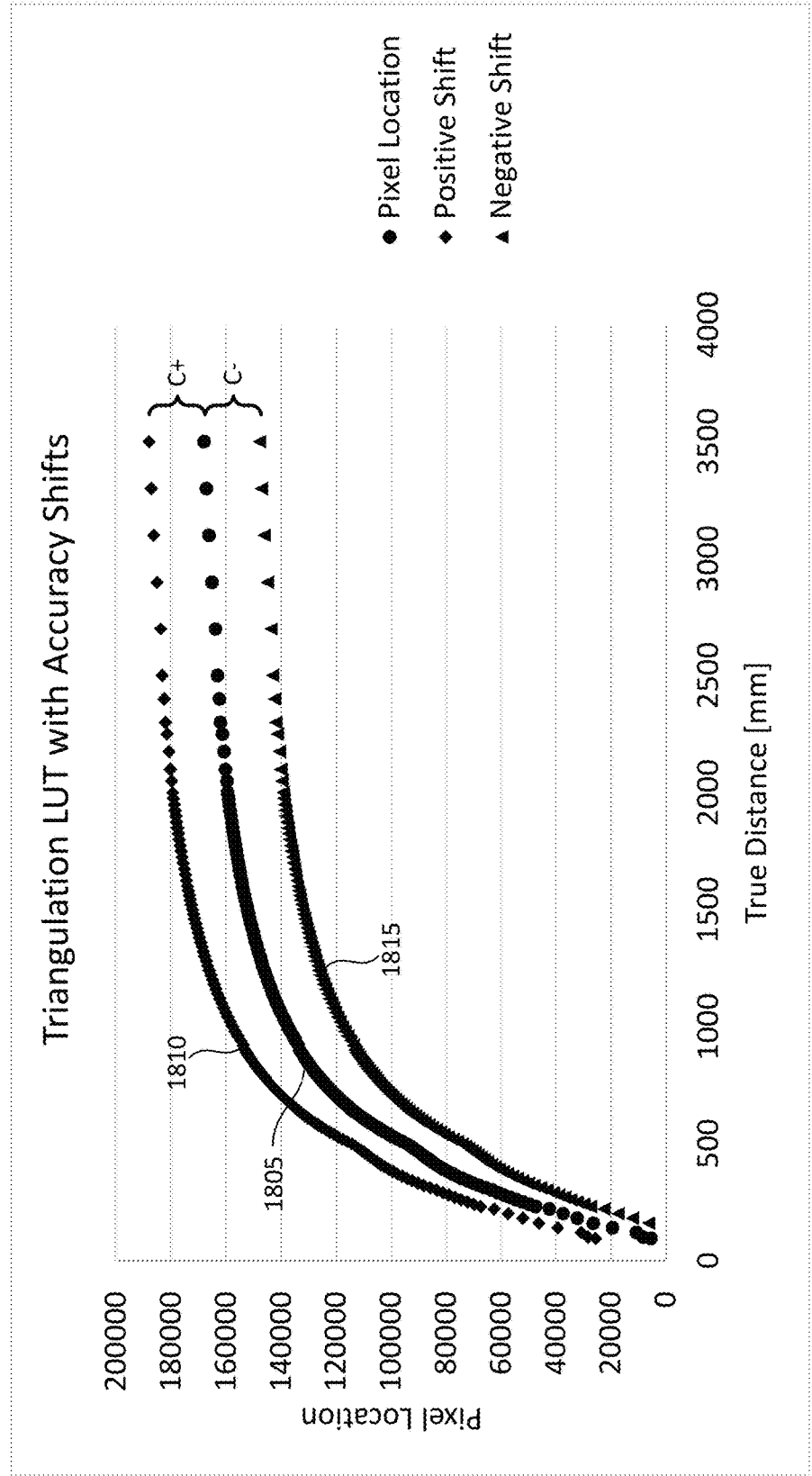
FIG. 18 depicts exemplary pixel domain shifts of a pixel:distance transfer function for a distance sensor.

FIG. 18 depicts exemplary pixel domain shifts of a pixel:distance transfer function for a distance sensor. The transfer functions depicted in exemplary plot 1800 may, by way of example and not limitation, define a relationship between distance and REMS location on a receiver (e.g., 140, 1525), such as a spatially distributed photosensitive pixel array.

For example, the geometry disclosed at least with reference to FIGS. 1 and 15 may be defined, for example, by a non-linear curve such as is shown by transfer function plot 1805. The transfer function plot 1805 may, for example, define a position:distance characteristic of a sensor when configured to measure distance within a predetermined accuracy threshold. For example, the transfer plot 1805 may represent a new condition of the sensor. The sensor may, for example, not have aged and/or been exposed to stressors.

Aging, stressors, or some combination thereof may, by way of example and not limitation, cause a shift in the transfer function. For example, various components (e.g., emitter, receiver, lens(es), housing) may have shifted relative to one another. In a first depicted example, the transfer function is shifted upwards as depicted by plot 1810 by a substantially constant value C+. Accordingly, a given pixel location now corresponds to a shorter distance. For example, in the depicted example, a pixel location 100,000 originally corresponded to about 500 mm, and now corresponds to about 400 mm. Accordingly, if the sensor is still calibrated based on the transfer function plot 1805 which applied before the transfer function shifted, at 500 mm, the sensor would have an error of approximately 100 mm.

Similarly, in a second depicted example, the transfer function is shifted downwards as depicted by plot 1815 by a substantially constant value C−. Accordingly, a given pixel location now corresponds to a farther distance. For example, in the depicted example, the pixel location 100,000 now corresponds to about 600 mm. Accordingly, if the sensor is still calibrated based on the transfer function plot 1805 which applied before the transfer function shifted, at 500 mm, the sensor would have an error of approximately 100 mm.

As depicted, the error in distance varies non-linearly with distance (as can be seen in FIG. 16). However, the transfer function shifts substantially a constant amount in the pixel domain. Various embodiments provide for field-calibration of a sensor by determining a calibration constant which effects a substantially constant shift in the position:distance transfer function. Accordingly, various embodiments may advantageously provide accurate and/or efficient (e.g., single point) calibration of a (triangulation) sensor(s).

Figure 19:
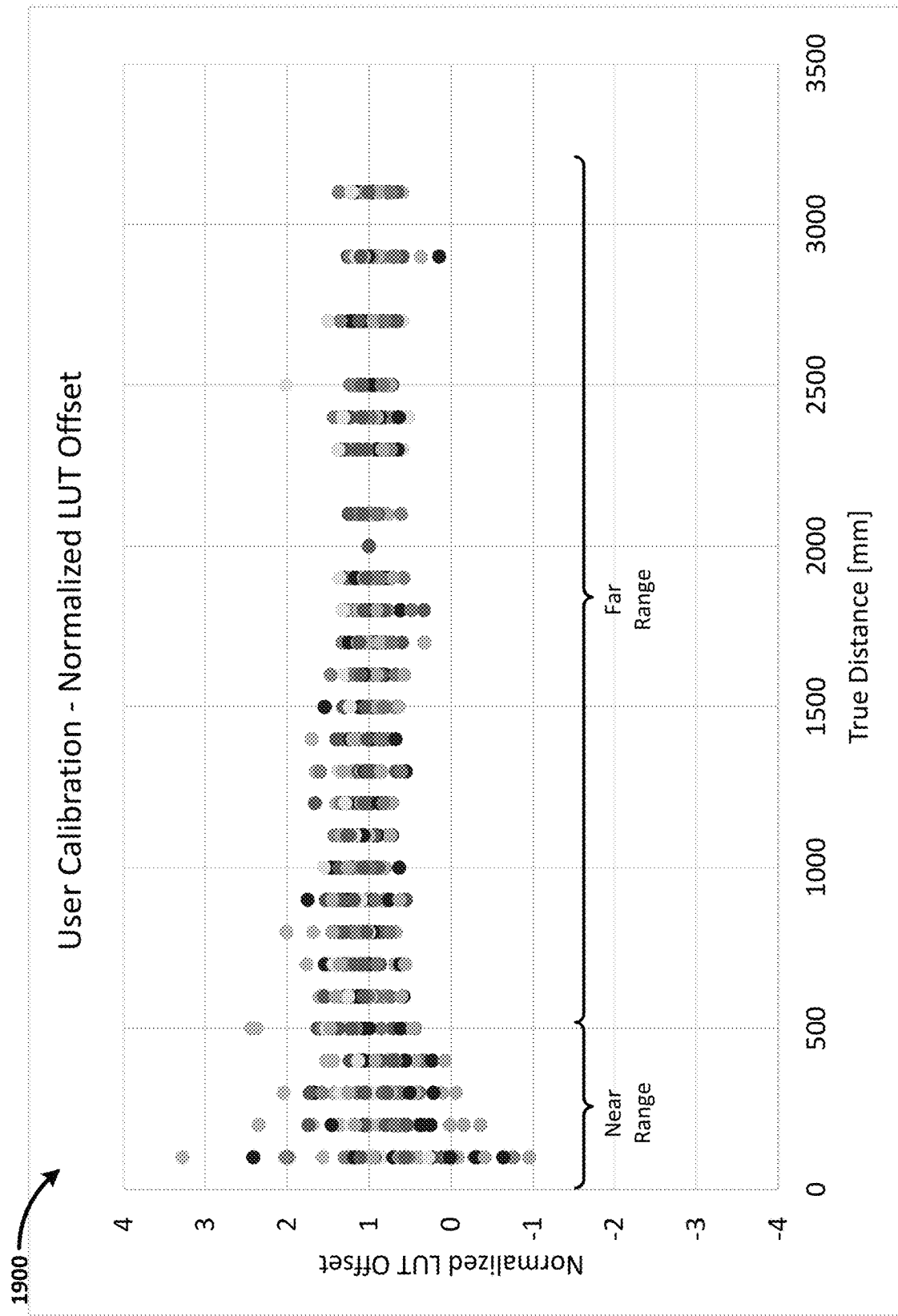
FIG. 19 depicts exemplary normalized offset results of single-point pixel-domain shift field calibration.

FIG. 19 depicts exemplary normalized offset results of single-point pixel-domain shift field calibration. The sensors depicted in plot 1600 of FIG. 16 were calibrated by teaching at a single distance to generate and apply a pixel-shift calibration constant to a lookup table (LUT) correlating pixel position:distance (e.g., defined by a transfer function similar to those shown in FIG. 18) such as, for example, is disclosed at least with reference to FIGS. 3-9. The amount of pixel offset required to achieve accuracy at each distance was divided by the pixel-shift calibration distance generated, and the results presented in scatterplot 1900 as normalized offset (dimensionless) vs true distance (mm). As can be seen, the calibration is especially effective at achieving the necessary shift in the far range (e.g., above about 500 mm).

Figure 20:
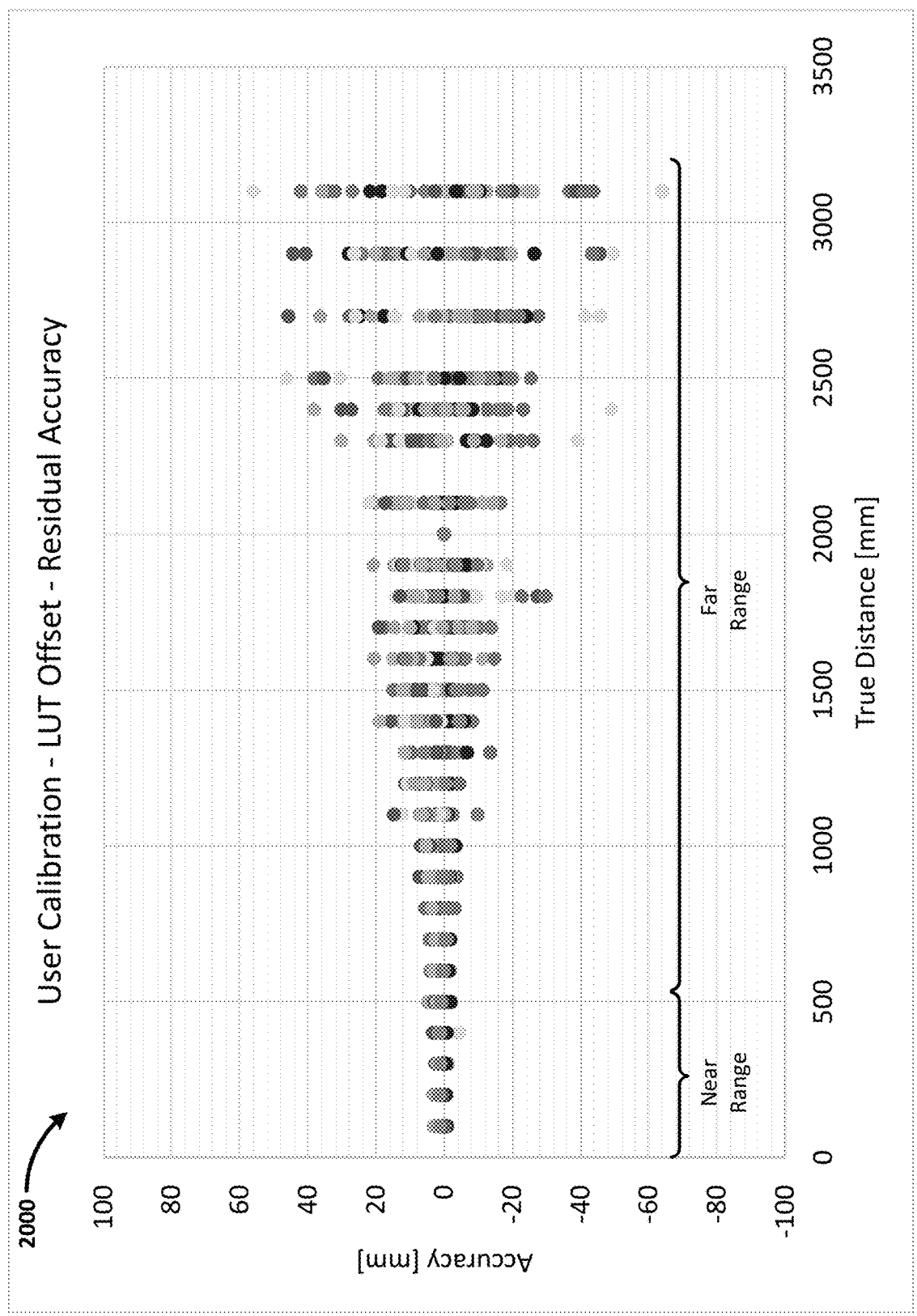
FIG. 20 depicts exemplary residual accuracy results of the single-point pixel-domain shift field calibration depicted in FIG. 19.

FIG. 20 depicts exemplary residual accuracy results of the single-point pixel-domain shift field calibration depicted in FIG. 19. The accuracy results of the same calibrated sensors depicted in plot 1900 of FIG. 19 were plotted as accuracy (mm) vs true distance (mm) in scatterplot 2000. As can be seen by comparing the calibrated scatterplot 2000 to the uncalibrated scatterplot 1600, the calibration effectively reduced the maximum error by more than 30 mm. The uncalibrated error exceeded +/−100 mm (beyond the view of the plot), while the calibrated error was between +/−70 mm (at outliers).

Furthermore, although the normalized offset was more variable at nearer distances, as seen in FIG. 19, nearer distances are less sensitive to calibration map errors (e.g., because of the nature of the relationship, as seen in FIGS. 15, 16, 18). Accordingly, the calibration effectively reduced the error in the near range from about +/−16 mm to about +/−4 mm (a reduction to about 25% of the previous error). Accordingly, calibration by performing a substantially constant shift of the transfer function in the position (e.g., pixel) domain advantageously improves accuracy. In various embodiments calibration by position-domain-shift a transfer function of a sensor may advantageously reduce error within a predetermined accuracy threshold. For example, various embodiments may advantageously provide rapid field-calibration to improve and/or restore accuracy by presenting one or more targets at one or more known distances.

Figure 21:
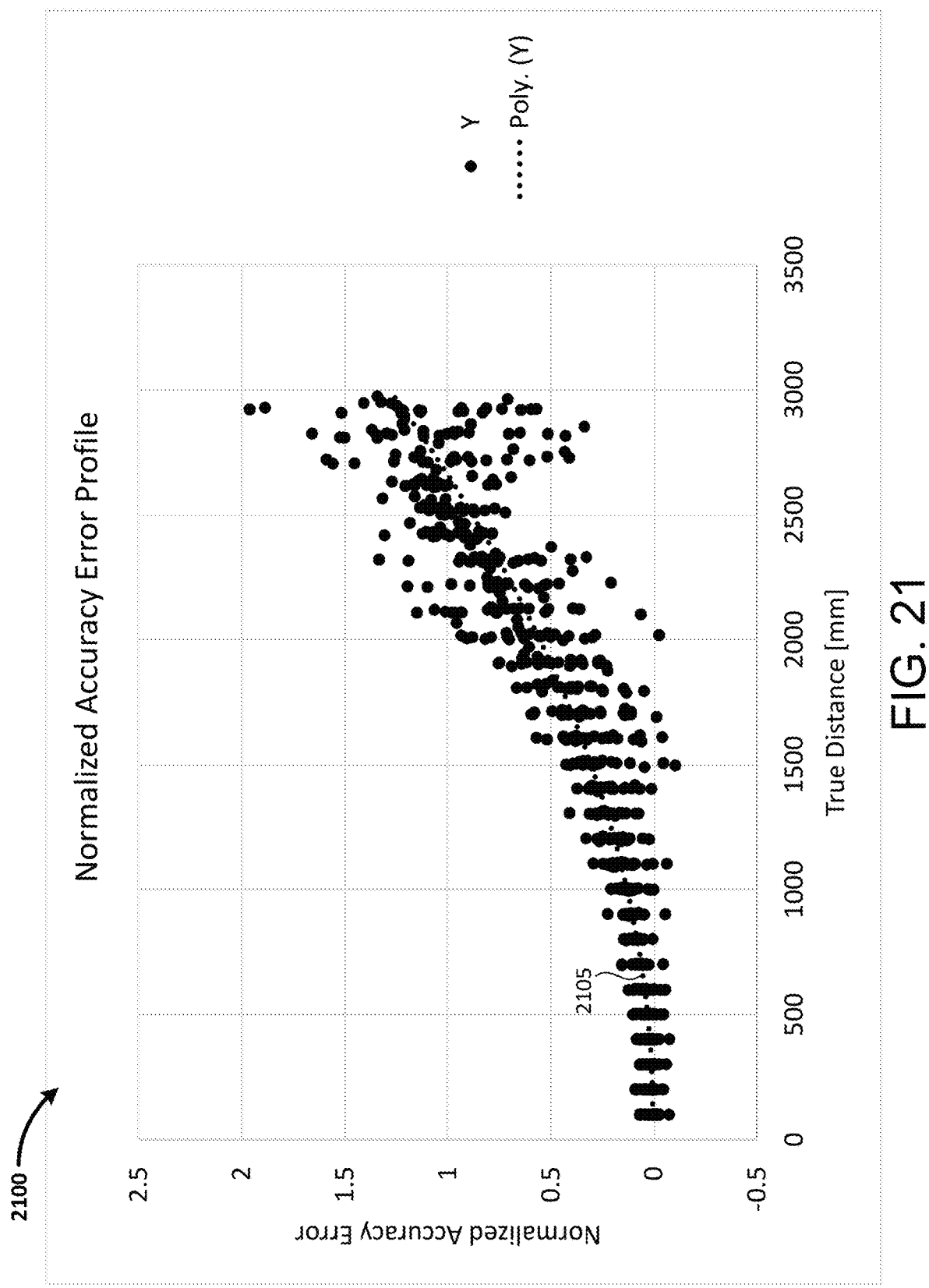
FIG. 21 depicts a curve fit to an exemplary normalized accuracy error profile for distance sensors after an aging process.

FIG. 21 depicts a curve fit to an exemplary normalized accuracy error profile for distance sensors after an aging process. In the depicted example, the magnitude of the accuracy error profile over true distance was normalized for all the uncalibrated sensors depicted in FIG. 16, and the results were plotted in scatterplot 2100. In the depicted example, a second-order polynomial curve fit was applied to determine a sensor characteristic profile describing the error.

This (polynomial) characteristic profile may then be calibrated for each sensor by determining one or more calibration constant. The calibration constant(s) may, for example, be configured as a coefficient (e.g., a weighting/scaling coefficient) of the function. Accordingly, the function may be advantageously calibrated to the magnitude of each sensor's accuracy error at one or more taught distances. In various embodiments this method may advantageously provide increased accuracy at taught distances further from the sensor (e.g., in a 'far range' such as, by way of example and not limitation, beyond about 500 mm). In various embodiments any distance(s) in the sensor's operating range may be used.

Figure 22:
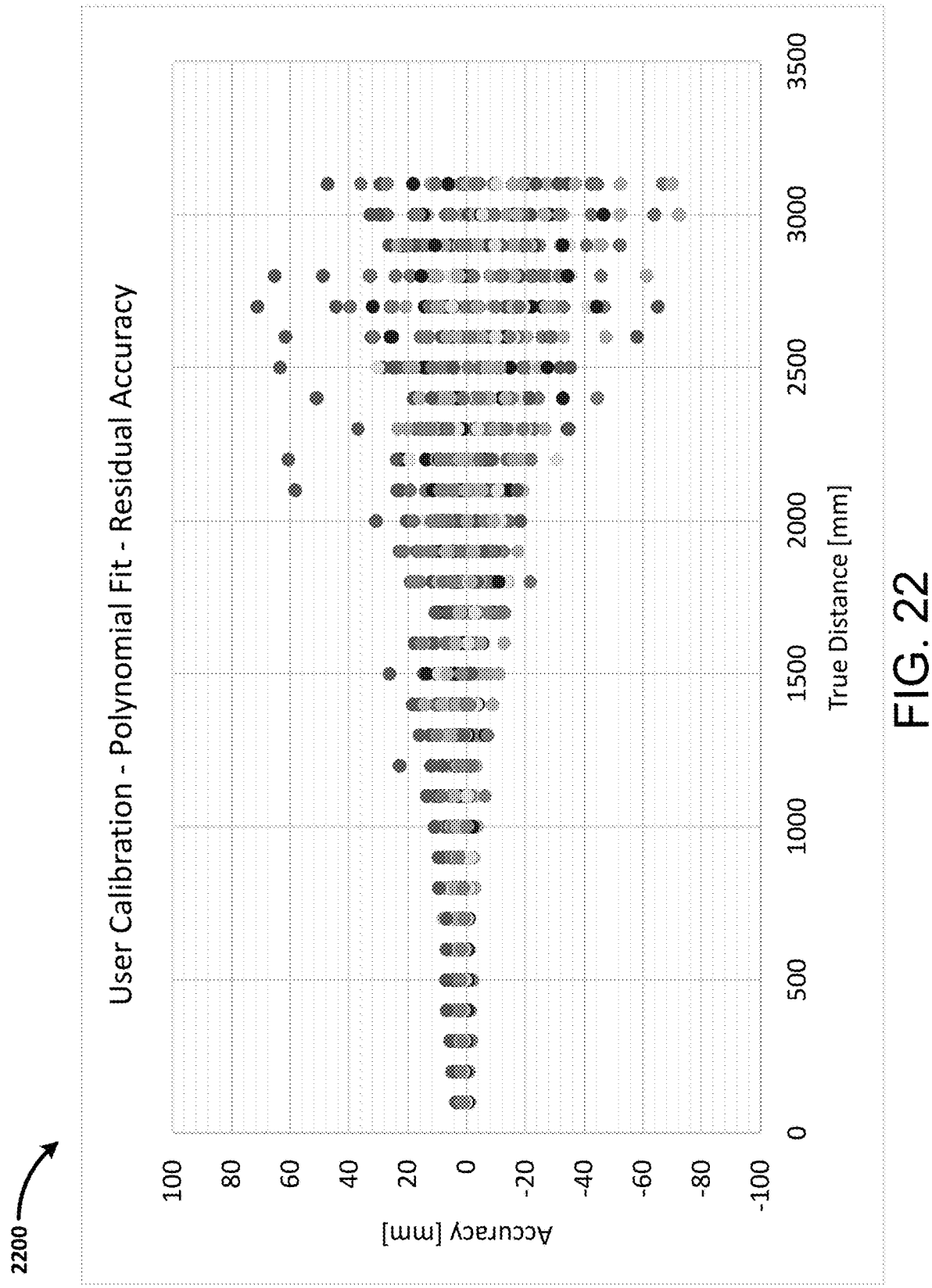
FIG. 22 depicts exemplary residual accuracy results of a single-point distance-domain field calibration using the curve fit depicted in FIG. 21.

FIG. 22 depicts exemplary residual accuracy results of a single-point distance-domain field calibration using the curve fit depicted in FIG. 21. In the depicted example, the uncalibrated sensors depicted in FIG. 16 were calibrated using a distance-shift calibration (vs. a pixel-shift) such as, for example, is disclosed as least with reference to FIGS. 9-14. The curve-fit depicted in FIG. 21 was applied, as calibrated by a correction factor.

For example, a model using one taught distance was employed and the curve fitting yielded a formula of the form:

$$Cd = Te^{*}(A^{*}Dm^2 + B^{*}Dm)/(A^{*}Tm^2 + B^{*}Tm) \quad \text{Equation 1:}$$

Where:
Cd=distance correction amount
Te=teach error, accuracy error from teach at the teach distance(s)
A=2nd order coefficient determined from curve fitting
B=1st order coefficient determined from curve fitting Dm=uncorrected measured distance Tm=uncorrected measured distance from teach at teach distance.

The calibration constant for each sensor may, for example, be defined by:

$$C=Te/(A*Tm^2+B*Tm) \qquad \text{Equation 2:}$$

The calibration constant may then be applied to determine the correction distance as a function of C and the uncalibrated measured distance Dm by Equation 3:

$$Cd=C*(A*Dm^2+B*Dm) \qquad \text{Equation 3:}$$

The final corrected distance measurement (Dc) can then be calculated as:

$$Dc=Dm-Cd \qquad \text{Equation 4:}$$

In various embodiments the distance measurement may be corrected during runtime by calculation of Cd on the fly (e.g., as disclosed at least with reference to FIGS. 9-11), during runtime by application of a correction LUT such as a LUT mapping multiple distances to a corresponding Cd (e.g., as disclosed at least with reference to FIGS. 12-14), during calibration by generation of a corrected LUT mapping multiple positions (e.g., pixel positions) to a corresponding Dc, or some combination thereof.

Although various embodiments have been described with reference to the figures, other embodiments are possible. For example, various embodiments may be configured to be (field) calibrated with one or more targets. Each target may, for example, be calibrated at one or more known distances. In various embodiments employing multiple targets and/or distances for calibration, multiple readings may be, by way of example and not limitation, averaged, taken the median of, or otherwise condensed into a single value. Accordingly, a substantially constant shift may be generated.

In various embodiments calibration may be enforced to be performed with at least one target at a distance corresponding to higher accuracy for the specific sensor characteristic(s) and/or configuration. For example, various embodiments may be configured to only complete calibration if a target is measured as being positioned at a distance of at least 5, 100, 500, 1000, 10000 mm, further, therebetween, in a range thereof, other appropriate distance threshold, or some combination thereof. In various embodiments a minimum target distance and/or target distance range, may be determined by sensor geometry, environment, sensor electrical and/or mechanical characteristic(s), or some combination thereof. In various embodiments a placement jig (e.g., a length of material of predetermined and/or adjustable length, a target holder, or some combination thereof) may be provided for quickly positioning a target at a known distance from the sensor.

In various embodiments a sensor may include, by way of example and not limitation, an optical sensor such as is described at least with reference to FIGS. 1, 7 of U.S. application Ser. No. 17/072,028, titled "IMAGE-BASED JAM DETECTION," filed by Wade Oberpriller, et al., on Oct. 15, 2020; with reference to FIGS. 1, 7 of U.S. Application Ser. No. 62/916,087, titled "Imaging System Using Triangulation," filed by Wade Oberpriller, et al., on Oct. 16, 2019; and, with reference to FIGS. 1, 7 of U.S. Application Ser. No. 62/924,020, titled "Imaging System Using Triangulation," filed by Wade Oberpriller, et al., on Oct. 21, 2019, the entire contents of which applications are incorporated herein by reference. For example, the receiver(s) may be configured as a 1-D pixel array, such as is described at least with reference to FIGS. 1 of the incorporated applications.

In various embodiments a reflected REMS (e.g., light signal) onto a receiver may result in a profile that may be generally bell-shaped or Gaussian (e.g., as disclosed at least with reference to FIGS. 3B of the aforementioned and incorporated applications). The profile may, for example, spread across multiple pixels of a multi-pixel receiver. Various embodiments may determine a centroid of the profile. Various embodiments may, for example, interpolate between pixels to determine a position of the centroid. Accordingly, various embodiments may advantageously digitally reconstruct a location of the centroid of the REMS with sub-pixel accuracy.

In various embodiments a sensor may be configured to detect a distance with reference to a background and/or in the absence of a background. Various embodiments may, for example, be configured to detect a jam with reference to a background (e.g., a background mode) and/or in a backgroundless mode. Such embodiments may, by way of example and not limitation, be configured as disclosed at least with reference to FIGS. 1-4 of U.S. Provisional Application Ser. No. 63/158,697, titled "NON-CONTACT MOTION DETECTION SENSOR UTILIZING DISTANCE AND INTENSITY STATISTICS," filed by Wade Oberpriller, et al., on Mar. 9, 2021, the entire contents of which are incorporated herein by reference. Various embodiments may, for example, be configured to field calibrate (e.g., automatically) based on a target at a known distance (e.g., a background for a backgrounding mode, a target in a known relationship to a conveyor in a backgroundless mode). Accordingly, various embodiments may advantageously automatically calibrate without user interference. Various embodiments may, therefore, advantageously maintain more accurate readings.

Various embodiments may, for example, automatically calibrate upon being activated (e.g., powered on), based on a predetermined threshold (e.g., time, cycles) such as disclosed at least with reference to FIG. 2, after and/or before every measurement, upon manual input (e.g., remote and/or local user-initiated generation of a calibration initiation signal), or some combination thereof.

Although an exemplary system has been described with reference to the figures, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a field-adjustable distance sensor may include an emitter configured to launch an electromagnetic signal. The sensor may include one or more sensing elements configured to generate a detection signal in response to a reflection of the electromagnetic signal. The detection signal may be a function of a position of the light signal on the at least one sensing element. The sensor may include at least one memory module including at least one datastore correlating each of a plurality of measured distances to a corresponding position vector. The correlation may be defined by a transfer function. The sensor may include a control circuit configured to perform calibration operations in a teach mode. The calibration operations may include operate the emitter to launch a first electromagnetic signal at a target located at a known distance from the at least one sensing element. The calibration operations may include receive from the sensing element(s) a first detection signal corresponding to a reflection of the first electromagnetic signal. The calibration operations may include determine a first position vector as a function of the first detection signal. The calibration operations may include receive a calibration distance signal corresponding to the known distance. The calibration operations may include, if a difference between the known distance and a distance in the datastore correlated to the first position vector is greater than a calibration threshold, then generate, as a function of the calibration distance signal and the first position vector, a calibration constant configured to translate the transfer function by a substantially constant position value.

The calibration operations may further include determine a second position vector as a function of the calibration distance signal; and, compare the first position vector and the second position vector. The difference between the known distance and the distance in the datastore may be greater than the calibration threshold if the comparison of the first position vector and the second position vector is greater than the calibration threshold. If the comparison is not zero, then the calibration constant may be generated as a function of the comparison.

The calibration constant may be a third position vector. The third position vector may be substantially equal to a difference between the first position vector and the second position vector. The calibration operations may further include storing the calibration constant. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include apply the third position vector to the measured position vector to generate a calibrated position vector. The distance measurement operations may include generate a calibrated distance measurement signal by retrieving a distance from the lookup table corresponding to the calibrated position vector. The calibration operations may further include apply the third position vector to a plurality of the position vectors in the lookup table to generate a calibrated datastore.

The memory module(s) may further include a predetermined sensor characteristic profile. The calibration operations may further include determine an expected position vector as a function of the calibration distance signal. The calibration operations may include generate a first distance signal by determining a distance in the datastore corresponding to the expected position vector. The calibration operations may include generate a second distance signal by determining a distance in the datastore corresponding to the expected position vector. The calibration operations may include compare the first distance signal and the second distance signal. The difference between the known distance and the distance in the datastore may be greater than the calibration threshold if the comparison of the first distance signal and the second position signal is greater than the calibration threshold. If the comparison is not zero, then the calibration constant may be generated as a function of the comparison and the predetermined sensor characteristic profile. The predetermined sensor characteristic may include at least one parameter of a curve-fit relationship correlating distance and sensor error. The curve-fit relationship may be a polynomial function of at least a second order.

The calibration operations may further include store the calibration constant. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include generate a measured distance signal by determining a distance in the datastore corresponding to the measured position vector. The distance measurement operations may include apply the calibration constant and the predetermined sensor characteristic profile to the measured position vector to generate a calibrated distance signal.

The calibration operations may further include generate a correction datastore as a function of the datastore, the predetermined characteristic profile, and the calibration constant. The correction datastore may correlate each of two or more measured distances to a corresponding correction distance. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include generate a measured distance signal by determining a distance in the datastore corresponding to the measured position vector. The distance measurement operations may include retrieve a first correction distance from the datastore. The distance measurement operations may include generate a calibrated distance signal by applying the first correction distance to the measured distance signal. The calibration operations may further include generate a calibrated datastore as a function of the datastore, the predetermined characteristic profile, and the calibration constant. The calibrated datastore may correlate each of two or more position vectors to a corresponding calibrated distance.

In an illustrative aspect, a method of field-calibrating a distance sensor may include providing an emitter configured to launch an electromagnetic signal, and at least one sensing element configured to generate a detection signal in response to a reflection of the electromagnetic signal. The detection signal may be a function of a position of the light signal on the at least one sensing element. The method may further include providing at least one memory module include at least one datastore correlating each of a plurality of measured distances to a corresponding position vector. The correlation may be defined by a transfer function. The method may further include providing a control circuit configured to, in a teach mode, perform calibration operations. The calibration operations may include operate the emitter to launch a first electromagnetic signal at a target located at a known distance from the at least one sensing element. The calibration operations may include receive from the at least one sensing element a first detection signal corresponding to a reflection of the first electromagnetic signal. The calibration operations may include determine a first position vector as a function of the first detection signal. The calibration operations may include receive a calibration distance signal corresponding to the known distance. The calibration operations may include, if a difference between the known distance and a distance in the datastore correlated to the first position vector is greater than a calibration threshold, then generate, as a function of the calibration distance signal and the first position vector, a calibration constant configured to translate the transfer function by a substantially constant position value.

The calibration operations may further include determine a second position vector as a function of the calibration distance signal. The calibration operations may further include compare the first position vector and the second position vector. The difference between the known distance and the distance in the datastore may be greater than the calibration threshold if the comparison of the first position vector and the second position vector is greater than the calibration threshold. If the comparison is not zero, then the calibration constant may be generated as a function of the comparison.

The calibration operations may further include storing the calibration constant. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include apply the third position vector to the measured position vector to generate a calibrated position vector. The distance measurement operations may include generate a calibrated distance measurement signal by retrieving a distance from the lookup table corresponding to the calibrated position vector.

The calibration operations may further include apply the third position vector to two or more of the position vectors in the lookup table to generate a calibrated datastore. The at least one memory module may further include a predetermined sensor characteristic profile. The calibration operations may further include determine an expected position vector as a function of the calibration distance signal. The calibration operations may further include generate a first distance signal by determining a distance in the datastore corresponding to the expected position vector. The calibration operations may further include generate a second distance signal by determining a distance in the datastore corresponding to the expected position vector. The calibration operations may further include compare the first distance signal and the second distance signal. The difference between the known distance and the distance in the datastore may be greater than the calibration threshold if the comparison of the first distance signal and the second position signal is greater than the calibration threshold. If the comparison is not zero, then the calibration constant may be generated as a function of the comparison and the predetermined sensor characteristic profile.

The calibration operations may further include storing the calibration constant. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include generate a measured distance signal by determining a distance in the datastore corresponding to the measured position vector. The distance measurement operations may include apply the calibration constant and the predetermined sensor characteristic profile to the measured position vector to generate a calibrated distance signal.

The calibration operations may further include generate a correction datastore as a function of the datastore, the predetermined characteristic profile, and the calibration constant. The correction datastore may correlate each of multiple measured distances to a corresponding correction distance. The control circuit may be further configured to, in a run mode, perform distance measurement operations. The distance measurement operations may include operate the emitter to launch a second electromagnetic signal. The distance measurement operations may include receive from the at least one sensing element a second detection signal corresponding to a reflection of the second electromagnetic signal. The distance measurement operations may include determine a measured position vector as a function of the second detection signal. The distance measurement operations may include generate a measured distance signal by determining a distance in the datastore corresponding to the measured position vector. The distance measurement operations may include retrieve a first correction distance from the datastore. The distance measurement operations may include generate a calibrated distance signal by applying the first correction distance to the measured distance signal. The calibration operations may further include generate a calibrated datastore as a function of the datastore, the predetermined characteristic profile, and the calibration constant. The calibrated datastore may correlate each of multiple position vectors to a corresponding calibrated distance.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A field-adjustable distance sensor comprising:
   an emitter configured to launch an electromagnetic signal;
   at least one sensing element configured to generate a detection signal in response to a reflection of the electromagnetic signal, the detection signal being a function of a position of the electromagnetic signal on the at least one sensing element;
   at least one memory module comprising at least one datastore correlating each of a plurality of measured distances to a corresponding position vector, the correlation being defined by a transfer function; and,
   a control circuit configured to, in a teach mode, perform calibration operations comprising:
      operate the emitter to launch a first electromagnetic signal at a target located at a known distance from the at least one sensing element;
      receive from the at least one sensing element a first detection signal corresponding to a reflection of the first electromagnetic signal;
      determine a first position vector as a function of the first detection signal;
      receive a calibration distance signal corresponding to the known distance; and,
      if a difference between the known distance and a distance in the datastore correlated to the first position vector is greater than a calibration threshold, then generate, as a function of the calibration distance signal and the first position vector, a calibration constant configured to translate the transfer function by a substantially constant position value.

2. The distance sensor of claim 1, the calibration operations further comprising:
   determine a second position vector as a function of the calibration distance signal; and,
   compare the first position vector and the second position vector;
   wherein:
      the difference between the known distance and the distance in the datastore is greater than the calibration threshold if the comparison of the first position vector and the second position vector is greater than the calibration threshold, and,
      if the comparison is not zero, then the calibration constant is generated as a function of the comparison.

3. The distance sensor of claim 2, wherein the calibration constant is a third position vector.

4. The distance sensor of claim 3, wherein the third position vector is substantially equal to a difference between the first position vector and the second position vector.

5. The distance sensor of claim 3, wherein:
   the calibration operations further comprise storing the calibration constant, and,
   the control circuit is further configured to, in a run mode, perform distance measurement operations comprising:
      operate the emitter to launch a second electromagnetic signal;
      receive from the at least one sensing element a second detection signal corresponding to a reflection of the second electromagnetic signal;
      determine a measured position vector as a function of the second detection signal;
      apply the third position vector to the measured position vector to generate a calibrated position vector; and,
      generate a calibrated distance measurement signal by retrieving a distance from a lookup table corresponding to the calibrated position vector.

6. The distance sensor of claim 3, wherein the calibration operations further comprise apply the third position vector to a plurality of the position vectors in a lookup table to generate a calibrated datastore.

7. The distance sensor of claim 1, the at least one memory module further comprising a predetermined sensor characteristic profile, and the calibration operations further comprising:
   determine an expected position vector as a function of the calibration distance signal;
   generate a first distance signal by determining a distance in the datastore corresponding to the expected position vector;
   generate a second distance signal by determining a distance in the datastore corresponding to the expected position vector; and,
   compare the first distance signal and the second distance signal, wherein:
      the difference between the known distance and the distance in the datastore is greater than the calibration threshold if the comparison of the first distance signal and the second position signal is greater than the calibration threshold, and,
      if the comparison is not zero, then the calibration constant is generated as a function of the comparison and the predetermined sensor characteristic profile.

8. The distance sensor of claim 7, wherein the predetermined sensor characteristic comprises at least one parameter of a curve-fit relationship correlating distance and sensor error.

9. The distance sensor of claim 8, wherein the curve-fit relationship is a polynomial function of at least a second order.

10. The distance sensor of claim 7, wherein the calibration operations further comprise store the calibration constant, and,
   the control circuit is further configured to, in a run mode, perform distance measurement operations comprising:
      operate the emitter to launch a second electromagnetic signal;
      receive from the at least one sensing element a second detection signal corresponding to a reflection of the second electromagnetic signal;
      determine a measured position vector as a function of the second detection signal;
      generate a measured distance signal by determining a distance in the datastore corresponding to the measured position vector; and,
      apply the calibration constant and the predetermined sensor characteristic profile to the measured position vector to generate a calibrated distance signal.

11. The distance sensor of claim 7, wherein:
the calibration operations further comprise generate a correction datastore as a function of the datastore, the predetermined characteristic profile, and the calibration constant, wherein the correction datastore correlates each of a plurality of measured distances to a corresponding correction distance, and
the control circuit is further configured to, in a run mode, perform distance measurement operations comprising:
operate the emitter to launch a second electromagnetic signal;
receive from the at least one sensing element a second detection signal corresponding to a reflection of the second electromagnetic signal;
determine a measured position vector as a function of the second detection signal;
generate a measured distance signal by determining a distance in the datastore corresponding to the measured position vector;
retrieve a first correction distance from the datastore; and,
generate a calibrated distance signal by applying the first correction distance to the measured distance signal.

12. The distance sensor of claim 7, wherein the calibration operations further comprise generate a calibrated datastore as a function of the datastore, the predetermined characteristic profile, and the calibration constant, wherein the calibrated datastore correlates each of a plurality of position vectors to a corresponding calibrated distance.

13. The distance sensor of claim 1, wherein the electromagnetic signal comprises a light signal.

14. A method of field-calibrating a distance sensor comprising providing:
an emitter configured to launch an electromagnetic signal;
at least one sensing element configured to generate a detection signal in response to a reflection of the electromagnetic signal, the detection signal being a function of a position of the electromagnetic signal on the at least one sensing element;
at least one memory module comprising at least one datastore correlating each of a plurality of measured distances to a corresponding position vector, the correlation being defined by a transfer function; and,
operating a control circuit in a teach mode, to perform calibration operations comprising:
operate the emitter to launch a first electromagnetic signal at a target located at a known distance from the at least one sensing element;
receive from the at least one sensing element a first detection signal corresponding to a reflection of the first electromagnetic signal;
determine a first position vector as a function of the first detection signal;
receive a calibration distance signal corresponding to the known distance; and,
if a difference between the known distance and a distance in the datastore correlated to the first position vector is greater than a calibration threshold, then generate, as a function of the calibration distance signal and the first position vector, a calibration constant configured to translate the transfer function by a substantially constant position value.

15. The method of claim 14, the calibration operations further comprising:
determine a second position vector as a function of the calibration distance signal; and,
compare the first position vector and the second position vector;
wherein:
the difference between the known distance and the distance in the datastore is greater than the calibration threshold if the comparison of the first position vector and the second position vector is greater than the calibration threshold, and,
if the comparison is not zero, then the calibration constant is generated as a function of the comparison.

16. The method of claim 15, wherein:
the calibration constant comprises a third position vector,
the calibration operations further comprise storing the calibration constant, and,
the control circuit is further configured to, in a run mode, perform distance measurement operations comprising:
operate the emitter to launch a second electromagnetic signal;
receive from the at least one sensing element a second detection signal corresponding to a reflection of the second electromagnetic signal;
determine a measured position vector as a function of the second detection signal;
apply the third position vector to the measured position vector to generate a calibrated position vector; and,
generate a calibrated distance measurement signal by retrieving a distance from a lookup table corresponding to the calibrated position vector.

17. The method of claim 15, wherein the calibration constant comprises a third position vector, and the calibration operations further comprise apply the third position vector to a plurality of the position vectors in a lookup table to generate a calibrated datastore.

18. The method of claim 14, the at least one memory module further comprising a predetermined sensor characteristic profile, and the calibration operations further comprising:
determine an expected position vector as a function of the calibration distance signal;
generate a first distance signal by determining a distance in the datastore corresponding to the expected position vector;
generate a second distance signal by determining a distance in the datastore corresponding to the expected position vector; and,
compare the first distance signal and the second distance signal,
wherein:
the difference between the known distance and the distance in the datastore is greater than the calibration threshold if the comparison of the first distance signal and the second position signal is greater than the calibration threshold, and,
if the comparison is not zero, then the calibration constant is generated as a function of the comparison and the predetermined sensor characteristic profile.

19. The method of claim 18, wherein the calibration operations further comprise storing the calibration constant, and,
the control circuit is further configured to, in a run mode, perform distance measurement operations comprising:
operate the emitter to launch a second electromagnetic signal;
receive from the at least one sensing element a second detection signal corresponding to a reflection of the second electromagnetic signal;

determine a measured position vector as a function of the second detection signal;

generate a measured distance signal by determining a distance in the datastore corresponding to the measured position vector; and, apply the calibration constant and the predetermined sensor characteristic profile to the measured position vector to generate a calibrated distance signal.

20. The method of claim 18, wherein:

the calibration operations further comprise generate a correction datastore as a function of the datastore, the predetermined characteristic profile, and the calibration constant, wherein the correction datastore correlates each of a plurality of measured distances to a corresponding correction distance, and the control circuit is further operated to, in a run mode, perform distance measurement operations comprising:

operate the emitter to launch a second electromagnetic signal;

receive from the at least one sensing element a second detection signal corresponding to a reflection of the second electromagnetic signal;

determine a measured position vector as a function of the second detection signal;

generate a measured distance signal by determining a distance in the datastore corresponding to the measured position vector;

retrieve a first correction distance from the datastore; and, generate a calibrated distance signal by applying the first correction distance to the measured distance signal.

21. The method of claim 18, wherein the calibration operations further comprise generate a calibrated datastore as a function of the datastore, the predetermined characteristic profile, and the calibration constant, wherein the calibrated datastore correlates each of a plurality of position vectors to a corresponding calibrated distance.

22. The method of claim 14, wherein the electromagnetic signal comprises a light signal.

* * * * *